(12) United States Patent
Zlotnik et al.

(10) Patent No.: US 12,086,440 B2
(45) Date of Patent: Sep. 10, 2024

(54) VIRTUAL BINNING IN A MEMORY DEVICE

(71) Applicant: Micron Technology, Inc., Boise, ID (US)

(72) Inventors: Leon Zlotnik, Camino, CA (US); Brian Toronyi, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 17/867,396

(22) Filed: Jul. 18, 2022

(65) Prior Publication Data

US 2024/0020036 A1 Jan. 18, 2024

(51) Int. Cl.
*G06F 3/06* (2006.01)

(52) U.S. Cl.
CPC ............ *G06F 3/0638* (2013.01); *G06F 3/061* (2013.01); *G06F 3/0683* (2013.01)

(58) Field of Classification Search
CPC ...... G06F 3/0638; G06F 3/061; G06F 3/0683; G06F 2212/7201
See application file for complete search history.

(56) References Cited

U.S. PATENT DOCUMENTS

| | | | |
|---|---|---|---|
| 6,389,507 B1 * | 5/2002 | Sherman | H04L 45/7453 711/108 |
| 8,966,155 B1 | 2/2015 | Mulligan | |
| 10,915,475 B2 | 2/2021 | Dubey et al. | |
| 2009/0259805 A1 | 10/2009 | Kilzer et al. | |
| 2011/0153911 A1 * | 6/2011 | Sprouse | G06F 12/0871 711/119 |
| 2014/0372726 A1 * | 12/2014 | Koo | G06F 12/10 711/206 |
| 2015/0220273 A1 * | 8/2015 | Sun | G06F 3/0659 711/103 |
| 2016/0283115 A1 * | 9/2016 | Gaertner | G06F 3/064 |

* cited by examiner

*Primary Examiner* — Chie Yew
(74) *Attorney, Agent, or Firm* — Brooks, Cameron & Huebsch, PLLC

(57) ABSTRACT

A first memory resource is configured to store a data structure. The first memory resource is coupled to a second memory resource that is configured to store a plurality of data structures. A processing device is coupled to the first memory resource, the second memory resource, and a third memory resource. The processing device writes data entries to the data structure within the first memory resource, determine that the data structure within the first memory resource includes a threshold quantity of data entries, and write the contents of the data structure within the first memory resource to a data structure within the second memory resource. The processing resource is further configured to move the contents of the contents of the data structure in the second memory resource to the third memory resource by readdressing the entries written within the second memory resource to virtual addresses associated with the third memory resource.

20 Claims, 13 Drawing Sheets

VIRTUAL BINNING IN A MEMORY DEVICE

TECHNICAL FIELD

Embodiments of the disclosure relate generally to digital logic circuits, and more specifically, relate to a virtual binning in a memory device.

BACKGROUND

A memory system can include one or more digital circuits that can include various circuitry. In general, a portion of the circuitry can provide a voltage signal to power the digital circuits and/or to power components of the memory system.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
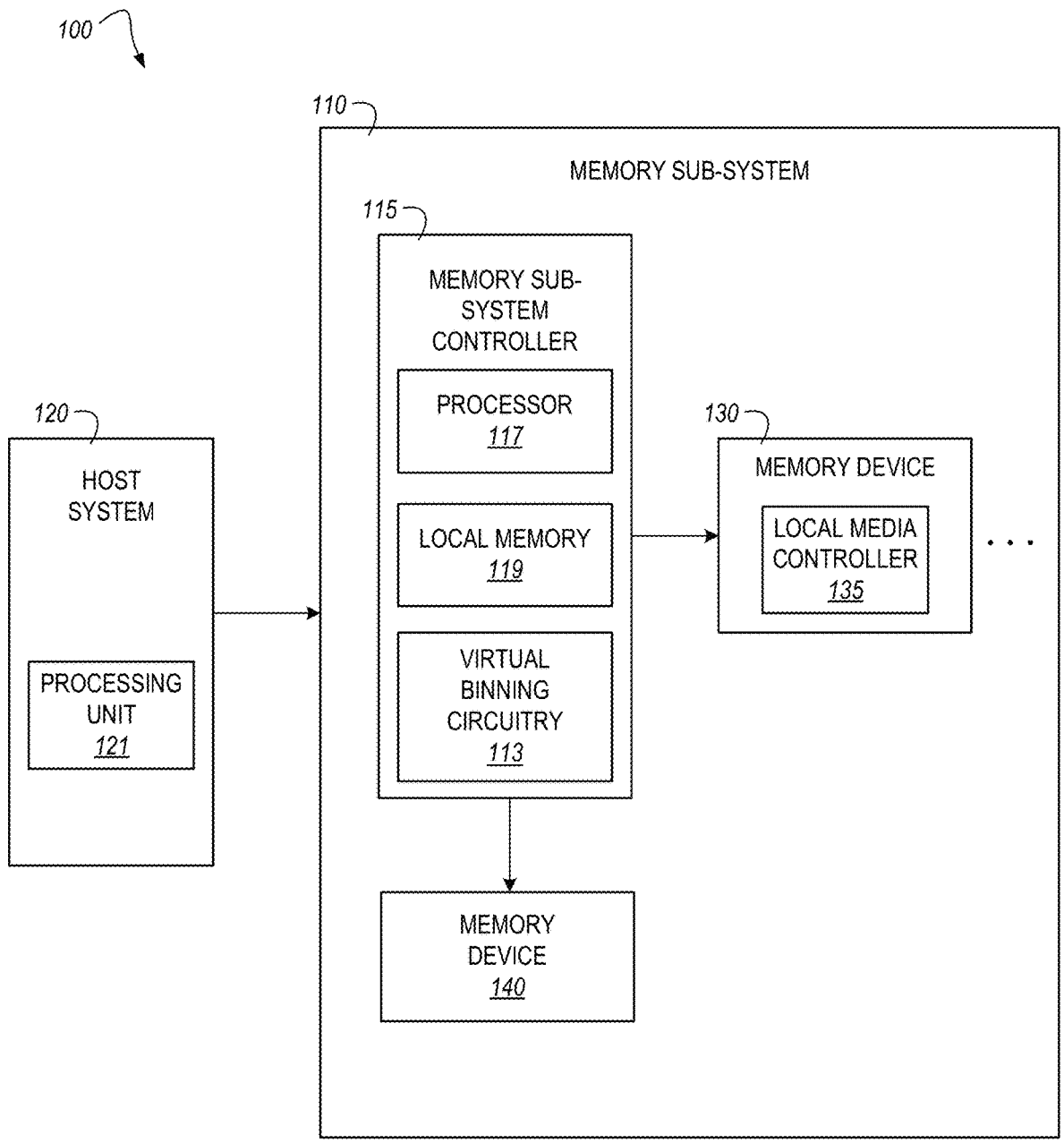
FIG. 1 illustrates an example computing system that includes a memory sub-system in accordance with some embodiments of the present disclosure.

Aspects of the present disclosure are directed to virtual binning in a memory device and, in particular to memory sub-systems that include virtual binning circuitry. The virtual binning circuitry can control organization of data entries in a data structure that can be stored within one or more memory resources that are associated with the memory sub-system and the consolidation of multiple such data structures into one or more bins (e.g., virtual bins). A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation, data is written to, and retrieved from the memory sub-system. Some data are written to persistent memory devices within the memory sub-system for long-term storage, while other data are written to non-persistent memory devices within the memory sub-system for quick, short-term retrieval. Still other data are written to various memory resources (or portions of memory resources) and/or caches of the memory sub-system to assist with performance of operations involving the memory sub-system. For example, various memory resources and/or caches can be utilized during operation of the memory sub-system to provide read caching, write-through caching, write-back caching, and/or write-around caching. In addition, some memory resources and/or caches of the memory sub-system can be allocated to store various tables that are utilized during operation of the memory sub-system. One such example is a logical-to-physical (L2P) table that is used to map logical addresses utilized by a host system to physical addresses of the memory sub-system where data is physically stored. Another such example is a database containing an organized collection of data that is stored within the memory resource and/or cache.

In some embodiments, when data is written to such memory resources and/or caches, the data can be written sequentially (e.g., in an ascending or descending order) to physical addresses of the memory resource and/or cache in the order in which the data is received. For example, if a vector of data entries [51, 7, 300, 12, 3] is to be written to a memory resource and/or cache, the first data entry (51) is generally written to a first physical address (or "zeroth address location") of the memory resource and/or cache in the event that the data is ordered in an ascending manner. When the second data entry (7) is written to the memory resource and/or cache, the first data entry (51) is shifted to a second physical address (or "first address location") of the memory resource and/or cache, and the second data entry (7) can be written to the first physical address (or "zeroth address location") of the memory resource and/or cache. When the third data entry (300) is written to the memory resource and/or cache, the first data entry (51) can be shifted to a third physical address (or "second address location") of the memory resource and/or cache, the second data entry (7) can be shifted to the second physical address (or "first address location") of the memory resource and/or cache, and the third data entry (300) can be written to the first physical address (or "zeroth address location") of the memory resource and/or cache. This pattern may be repeated for the remaining data entries (e.g., the fourth data entry (12) and the fifth data entry (7), in this particular example).

It is noted that the above example can be utilized in scenarios in which the data is not required to be ordered. In scenarios in which the data is ordered as it is written to the memory resource and/or cache, the following example is illustrative. Considering the same vector of data entries [51, 7, 300, 12, 3], the first data entry (51) is generally written to a first physical address (or "zeroth address location") of the memory resource and/or cache. When the second data entry (7) is written to the memory resource and/or cache, the first data entry (51) can be shifted to a second physical address (or "first address location") of the memory resource and/or cache, and the second data entry (7) can be written to the first physical address (or "zeroth address location") of the memory resource and/or cache. Continuing with this example, because the third data entry (300) is larger (e.g., has a greater numerical value) than the first data entry and the second data entry, the third data entry is written to the third physical address (or "second address location") of the memory resource and/or cache. Now, the fourth data entry (12) is less (e.g., has a lower numerical value) than the first data entry (51) and the third data entry (300) but is larger than the second data entry (7), the first data entry (51) and the third data entry (300) are shifted to a third physical address (or "second address location") and a fourth physical address (or "third address location"), respectively, and the fourth data entry (12) is written to the second physical address (or "first address location") of the memory resource and/or cache. Finally, because the fifth data entry (3) is less than the first through fourth data entries, each of the first data entry through the fourth data entry are shifted one address location up (e.g., the third data entry (300) is shifted to a fifth physical address (or "fourth address location"), the first data value (51) is shifted to the fourth physical address (or "third address location"), the fourth data value (12) is shifted to the third physical address (or "second address location"), and the second data value (7) is shifted to the second physical address (or "first address location"). Finally, the fifth data value (3) is written to the first physical address (or "zeroth address location). Accordingly, a final order of the data entries in this approach is allocated such that the data entries are organized in an ascending order. It will be appreciated that the final order of the data entries in this approach can be organized in a descending order using similar operations to those described above.

Another methodology for writing ordered data to a data structure in accordance with the disclosure is referred to as a center allocation data structure, which is a data structure and/or technique for writing data to a data structure in which the first data entry is written to an address location in the memory resource that is neither a first physical address (e.g., a "zeroth address location") of the memory resource nor a last physical address (e.g., an $N^{th}$ address location, where N is the total quantity of address locations in the memory resource) of the memory resource. In some embodiments, the first data entry can be written to an address location that is substantially physically equidistant from the first physical address of the memory resource and the last physical address of the memory resource. That is, in some embodiments, the first data entry can be written to an address location that is in the middle of the memory resource with respect to the physical address spaces of the memory resource.

As used herein, the term "substantially" intends that the characteristic need not be absolute but is close enough so as to achieve the advantages of the characteristic. For example, "substantially equidistant" is not limited to a condition in which the address location that is substantially equidistant from the first physical address of the memory resource and the last physical address of the memory resource is absolutely equidistant from the first physical address of the memory resource and the last physical address of the memory resource but is equidistant from the first physical address of the memory resource and the last physical address of the memory resource within manufacturing limitations, operational conditions, etc. to achieve the characteristics of being "equidistant" from the first physical address of the memory resource and the last physical address of the memory resource. For example, if there are an even number of physical address locations in the memory resource, a physical address location that is substantially equidistant from the first physical address of the memory resource and the last physical address of the memory resource may not be at the exact physical center of the physical address locations but may be substantially equidistant such that components of the apparatus function as if said characteristics are the same or equal. It is further contemplated, however, that such characteristics may be exactly the same or exactly equal given the context of the disclosure.

In order to maintain an ordered (ascending) center allocation data structure in the memory resource, a second data entry can be written to an address location in the memory resource that is between the first physical address and the address at which the first data entry is written to if the second data entry has a value that is less than the value of the first data entry or the second data entry can be written to an address location in the memory resource that is between the last physical address and the address at which the first data entry is written to if the second data entry has a value that is greater than the value of the first data entry. It will be appreciated that, in order to maintain an ordered (descending) data structure in the memory resource, the second data entry can be written to an address location in the memory resource that is between the first physical address and the address at which the first data entry is written to if the second data entry has a value that is greater than the value of the first data entry or the second data entry can be written to an address location in the memory resource that is between the last physical address and the address at which the first data entry is written to if the second data entry has a value that is less than the value of the first data entry.

Stated alternatively, for a center allocation data structure, when subsequent data entries have values that are less than the values of previous entries, they are, for an ordered ascending data structure, written to addresses that are closer to the first physical address location in the memory device. Conversely, when subsequent data entries have values that are greater than the values of previous entries, they are, for an ordered ascending data structure, written to addresses that are closer to the last physical address location in the memory device. For an ordered descending data structure, when subsequent data entries have values that are less than the values of previous entries, they are written to addresses that are closer to the last physical address location in the memory device and when subsequent data entries have values that are greater than the values of previous entries, they are written to addresses that are closer to the first physical address location in the memory device.

In order to continue to maintain an ordered (ascending) center allocation data structure in the memory resource, a third data entry can be written to an address location in the memory resource that is between the address at which the second data value is written to and the first physical address of the memory resource if the third data entry has a value that is less than the value of the second data entry. If the value of the third data entry is between the value of the first data entry and the second data entry, the third data entry can be written to an address location that is between the address at which the first data value is written to and the address location at which the second data value is written to. If the third data entry has a value that is greater than the first data entry and the second data entry, the third data entry can be written to an address location in the memory resource that is between the last physical address and the address at which the first data entry is written to. It will be appreciated that, in order to maintain an ordered (descending) data structure in the memory resource, the third data entry can be written to an address location in the memory resource that is between the first physical address and the address at which the second data entry is written to if the third data entry has a value that is greater than the value of the second data entry and the value of the first data entry and so on and so forth.

In some embodiments, the second data entry and/or the third data entry in a center allocation data structure can be written to an address location that is immediately next to the address location at which the first data entry is written; however, embodiments are not so limited, and the second data entry and/or the third data entry can be written to any address location that is between the first physical address and the address at which the first data entry is written to or between the last physical address and the address at which the first data entry is written to.

As described in more detail herein, as the center allocation data structure is filled with data entries, each subsequent data entry can be written to the data structure in an address location based on the relative value of each data entry with respect to the values of previously written data entries. This can allow for a quantity of shift operations to keep the data structured in an ordered state to be reduced in comparison to the conventional approaches described above. Accordingly, by writing the data entries to the center allocation data structure in accordance with the present disclosure, performance (e.g., the overall functioning) of a computing system in which embodiments of the present disclosure operate can be improved in comparison to the conventional approaches described above at least because the quantity of costly shift operations required to maintain the data entries in the data structure can be reduced in comparison to such approaches.

In some embodiments, the data structures discussed in the disclosure (e.g., non-ordered data structures, ordered data structures, center allocation data structures, etc.) are written in a memory area or memory resource of a memory device that contains physical address locations. Once the data structure contains greater than or equal to a threshold quantity of data entries (e.g., once the data structure is filled such that there are no remaining address locations available to write data to in the data structure), the contents (e.g., the data entries and/or information corresponding to the data entries) of the data structure can be moved (e.g., copied or otherwise relocated) to a memory area of the memory device that contains virtual address locations. A set of virtual address locations associated with the memory that contains the virtual address locations can be referred to herein as a "bin" and multiple bins (e.g., sets of virtual address in the memory area that contains the virtual addresses) can be provided in the memory area that contains the virtual addresses.

As described in more detail herein, multiple data structures can be written to respective portions of a bin in the memory area of the memory device that contains virtual address locations in response to the data structures containing greater than or equal to the threshold quantity of data entries. This process can be repeated until the bin contains greater than or equal to a threshold quantity of data structures (e.g., once the bin is filled such that there are no remaining address locations available to write data to in the bin). Once the data structures have been written to the bin (e.g., to respective portions of the bin), new data entries can be written to the data structures by, for example, overwriting the previously written data structures until the data structures once again contain greater than or equal to the threshold quantity of data entries. The contents of these data structures can then be written to respective portions of a different bin in the memory area or memory resource of the memory device that contains virtual address locations and so on and so forth. By writing the contents of the data structures to the bins in the memory area of the memory device that contains virtual address locations, the data entries associated with the data structures can be preserved for future use (e.g., for future retrieval).

In some embodiments, the data structures and the bins that contain the contents of previously filled data structures can be stored in a foreground portion of the memory device. Over time, as more bins are filled with contents of subsequently filled data structures, these bins can be moved to virtual addresses locations that are in a background portion of the memory device. In some embodiments, this relocation of the filled bins from the foreground to the background of the memory device can be accomplished by readdressing (e.g., altering the virtual addresses of) the bins such that the addresses associated with the contents of the bins lie within the background of the memory device as opposed to rewriting the contents of the bins to different bins in the background region of the memory device.

As used herein, the "foreground portion" of the memory device generally refers to memory locations (e.g., memory cells that are addressable in groups) where data entries are allocated upon being written to a data structure that includes the memory locations. Data entries that are written to the foreground portion of the memory device are generally not altered or removed while they are written in the foreground portion of the memory device. In contrast, the "background portion" of the memory device generally refers to memory locations where data entries are processed and eventually removed as part of continually freeing up space in the memory device for new data entries. In some embodiments, operations can be concurrently performed in the foreground and background portions of the memory device. For example, data entries can be allocated to the foreground portion of the memory device concurrently with data entries being processed and/or removed from the background portion of the memory device.

In order to access the data entries that are written to the filled bins (e.g., the physical and/or virtual bins in the foreground and/or background, which contain the contents of the data structures in accordance with the present disclosure) efficiently, a quantity of data structures that are written to each bin (e.g., virtual bins that include data entries from multiple data structures) can be controlled. For example, some embodiments allow for the contents of four data structures to be written to each of the bins before the bin is determined to include greater than or equal to a threshold quantity of data structures and the bin is determined to be full. It will be appreciated that the contents of differing quantities of data structures (e.g., greater than four or less than four) can be written to each bin prior the bin being determined to include greater than or equal to the threshold quantity of data structures; however, in the interest of clarity, various non-limiting examples of the aspects of the present disclosure are provided herein in which the contents of four data structures to be written to each of the bins before the bin is determined to include greater than or equal to the threshold quantity of data structures and the bin is determined to be full.

For example, some previous approaches may attempt to transfer or merge sixteen data structures (e.g., tables, databases, etc.) into a single data structure once the sixteen data structures are determined to include greater than or equal to the threshold quantity of data entries. In scenarios in which each of the data structures includes 512 bytes, the resulting data structure after such a transfer or merge is completed can include 8,192 bytes. During construction of the single data structure that includes the, in this example, sixteen data structures, previous approaches generally search the data entries of the sixteen data structures based on the numerical values of the data entries and compile the single data structure such that the single data structure is ordered (e.g., either in ascending numerical order or in descending numerical order).

In such approaches, when a particular data entry is requested, the particular data entry may reside in the single data structure that contains the sixteen previously filled data structures or the particular data value may reside in one of the sixteen data structures that have been subsequently filled after the single data structure was constructed. This can require sixteen smaller searches (one for each of the sixteen data structures that have been subsequently filled after the single data structure was constructed) and one large search for the single data structure that contains the sixteen previously filled data structures for a total of seventeen searching operations.

In contrast, by merging the contents of four data structures into each of the bins, as described in more detail herein, each of the bins may contain only around 2,048 bytes of data (in embodiments in which the data structures each contain 512 bytes of data, for example). This can allow for the amount of computing resources (e.g., power, time, operations, etc.) consumed in searching for a particular data entry to be reduced in comparison to the approaches mentioned above. That is, in this example of the present disclosure, at most seven bins can be searched in addition to four data structures for a total of eleven searching operations. Accordingly, embodiments of the present disclosure improve the performance of a computing system in which embodiments of the present disclosure operate in comparison to the conventional approaches described above by reducing the amount of computing resources consumed in writing, storing, and/or retrieving data from data structures that are written to memory resources, caches, and/or memory devices of a memory sub-system.

Stated alternatively, current approaches generally utilize sixteen bins that contain 512 entries each. These bins are filled sequentially until all of them become full. After that there will be no more space available in these available bins. In order to empty these bins, the contents of all sixteen bins are generally transferred (e.g., merged) into one larger bin (e.g., having around 8,192 or "8K" entries). However, this operation generally involves more than a simple copy or move operation. In contrast, current approaches can perform an actual transfer or merge operation in order to resolve conflicting (e.g., duplicated entries) in the sixteen bins to write the 8K entries in order to the single larger bin.

In such approaches, the sixteen bins are often referred to as being in the "foreground" of the memory device while the larger bin is often referred to as being in the "background" of the memory device. This means that a total of around 16,384 or "16K" entries (8K in the foreground and 8K in the background) are generally utilized in current approaches. Accordingly, in order to search the entirety of entries in such approaches, seventeen searches (sixteen searches corresponding to each of the sixteen foreground bins and one search of the large 8K bin) are generally performed and may require sixteen merging engines (e.g., first-in first-out (FIFO) circuits).

However, as described in more detail herein, aspects of the present disclosure utilize virtual bins in the background instead of the larger bins relied on in current approaches. In addition, the quantity of bins in the background (e.g., the virtual bins of the present disclosure) is reduced to, for example, four virtual bins per memory bank. This can allow for four bins that contain around 512 entries with seven larger bins (e.g., virtual bins containing 2,048 or "2K" entries) to store the same amount of data entries as current approaches. However, in accordance with the present disclosure, the quantity of merging engines can be reduced to four (as opposed to sixteen) and eleven search operations (as opposed to seventeen) can be performed to locate particular data entries. This can lead to an improvement in a computing system in which embodiments of the present disclosure operate by, at minimum, reducing the quantity of searches performed and/or by reducing the quantity of circuit components (e.g., a reduction in merging engines).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include virtual binning circuitry 113. Although not shown in FIG. 1 so as to not obfuscate the drawings, the virtual binning circuitry 113 can include various circuitry to facilitate aspects of the disclosure described herein. In some embodiments, the virtual binning circuitry 113 can include special purpose circuitry in the form of an ASIC, FPGA, state machine, hardware processing device, and/or other logic circuitry that can allow the virtual binning circuitry 113 to orchestrate and/or perform operations to write data (e.g., data entries) to a data structure of a memory resource and/or to transfer or merge data written to one or more of such data structures to one or more bins (e.g., virtual bins) in memory banks of a memory device in accordance with the disclosure.

In some embodiments, the memory sub-system controller 115 includes at least a portion of the virtual binning circuitry 113. For example, the memory sub-system controller 115 can include a processor 117 (processing device) configured to execute instructions stored in local memory 119 for performing the operations described herein. In some embodiments, the virtual binning circuitry 113 is part of the host system 110, an application, or an operating system. The virtual binning circuitry 113 can be resident on the memory sub-system 110 and/or the memory sub-system controller 115. As used herein, the term "resident on" refers to something that is physically located on a particular component. For example, the virtual binning circuitry 113 being "resident on" the memory sub-system 110, for example, refers to a condition in which the hardware circuitry that comprises the virtual binning circuitry 113 is physically located on the memory sub-system 110. The term "resident on" may be used interchangeably with other terms such as "deployed on" or "located on," herein.

Figure 2:
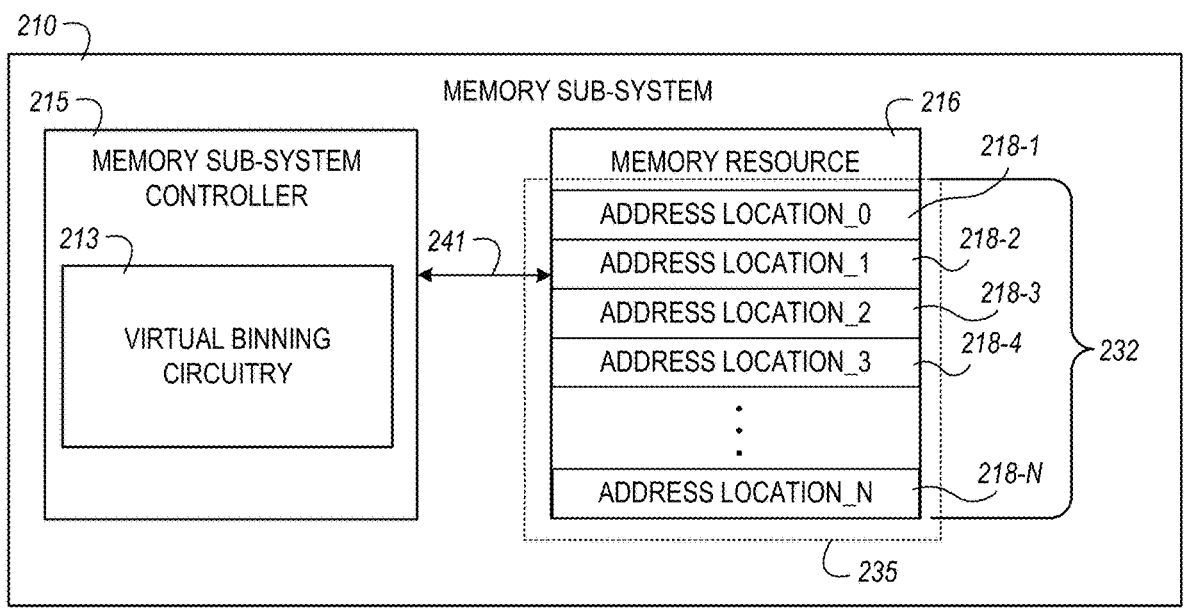
FIG. 2 illustrates an example memory sub-system in accordance with some embodiments of the present disclosure.

FIG. 2 illustrates an example memory sub-system 210 in accordance with some embodiments of the present disclosure. The example system, which can be referred to in the alternative as an "apparatus," includes a memory sub-system controller 215 and virtual binning circuitry 213 or "control circuitry," which can be analogous to the memory sub-system controller 115 and the virtual binning circuitry 113 illustrated in FIG. 1, herein. The memory sub-system 210 further includes a memory resource 216 that includes a plurality of address locations 218-1, 218-2, 218-3, 218-4 to 218-N (collectively referred to hereinafter as "address locations 218") that collectively form an address space 232 of the memory resource 216. As used herein, a "memory resource" can refer to a discrete memory component (e.g., a discrete circuit that includes memory cells that can include multiple address locations) or a portion or subset of memory cells of a memory device (e.g., the memory device 130 and/or the memory device 140 illustrated in FIG. 0.1, herein) that include multiple address locations. Accordingly, the term "memory resource," as used herein, is not limited to a discrete component or circuit and will be understood to encompass a portion, subset, or entirety of memory cells and/or address locations of a memory device. In some embodiments, a "memory resource" can refer to a portion or subset of memory cells in a memory bank, such as the memory banks 650 illustrated in FIG. 6 and/or the memory banks 750 illustrated in FIGS. 7A and 7B. Accordingly, in some embodiments, the memory sub-system 210 can include the memory banks 650 illustrated in FIG. 6 and/or the memory banks 750 illustrated in FIGS. 7A and 7B.

The address locations 218 can be physical address locations that correspond to one or more memory cells of the memory resource 216. In some embodiments, two hundred and fifty-six (256) address locations 218, five hundred and twelve (512) address locations 218, etc. can be provided within the memory resource 216. It will be appreciated, however, that the memory resource 216 can include greater than or less than these enumerated quantities of address locations 216 based on the size, memory density, and/or architecture, among other factors of the memory resource 216 and/or the memory sub-system 210. In some embodiments, the address locations 218 are logically addressable, for example, by the host system 120 illustrated in FIG. 1, herein.

The address locations 218 can be configured to store data entries in a data structure 232 (e.g., a center allocation data structure). As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure 232 can be configured to store a logical-to-physical (L2P) mapping table, although embodiments are not limited to this particular example.

The ADDRESS LOCATION_0 218-1 can be referred to as a "first physical address," a "zeroth address location," or a "lowermost physical location" of the memory resource 216, herein. The ADDRESS LOCATION N 218-N can be referred to as a "last physical address," an "$N^{th}$ address location," or an "uppermost physical location" of the memory resource 216, herein.

As shown in FIG. 2, the memory resource 216 is resident on the memory sub-system 210. In the example of FIG. 2, the memory resource 216 can be resident on the memory sub-system 210 and not resident on any other component of the memory sub-system. Embodiments are not so limited and although not explicitly illustrated so as to not obfuscate the drawing layout, the memory resource 216 can be resident (or partially-resident) on any component of the memory sub-system 210. For example, the memory resource 216 can be resident on the memory sub-system controller 215, the virtual binning circuitry 213, the memory device 130, the local media controller 135, and/or the memory device 140 illustrated in FIG. 1.

In a non-limiting example, an apparatus (e.g., the memory sub-system 210) includes a memory resource 216 and a processing device (e.g., the virtual binning circuitry 213). The apparatus can be a system-on-chip, although embodiments are not so limited. The processing device can write a first data entry to an address location 218 of the memory resource 216 that is neither a first physical address 218-1 of the memory resource nor a last physical address 218-N of the memory resource 216, i.e., the processing device can write a first data entry to an address location 218 of the memory resource 216 that is between a first physical address 218-1 of the memory resource nor a last physical address 218-N of the memory resource 216. In some embodiments, the processing device is configured to write the first data entry to the address location 218 of the memory resource 216 that is neither the first physical address 218-1 of the memory resource 216 nor the last physical address 218-N of the memory resource 216 by writing the data entry to an address location 218 of the memory resource that is substantially physically equidistant from the first physical address 218-1 of the memory resource 216 and the last physical address 218-N of the memory resource 216.

As described in more detail, herein, the memory resource 216 can include N address locations and (1) the first physical address 218-1 is a zeroth address location of the memory resource 216 and the last address location 218-N is an $N^{th}$ address location of the memory resource 216 or (2) the first physical address 218-1 is the $N^{th}$ address location of the memory resource 216 and the last address location 218-N is the zeroth address location of the memory resource 216. In addition, in some embodiments, the memory resource is configured to store the data entries in a data structure 232. In some embodiments, the data entries comprise logical-to-physical mapping entries associated with a memory sub-system 210 in which the memory resource 216 is deployed.

The processing device can determine whether a second data entry to be written to the memory resource 216 has a value that is greater than a value associated with the first data entry or a value that is less than the value associated with the first data entry. The processing device can then (1) in response to a determination that the second data entry has the value that is greater than a value associated with the first data entry, write the second data entry to an address location of the memory resource that is physically located between the address location of the memory resource to which the first data entry is written and the last physical address of the memory resource or (2) in response to a determination that the second data entry has the value that is less than the value associated with the first data entry, write the second data entry to an address location of the memory resource that is physically located between the address location of the memory resource to which the first data entry is written and the first physical address of the memory resource.

In some embodiments, the processing device can determine whether a third data entry to be written to the memory resource 216 (1) has a value that is greater than a value associated with the first data entry or a value that is less than the value associated with the first data entry or (2) has a value that is greater than the value associated with the second data entry or a value that is less than the value associated with the second data entry. In response to a determination that the third data entry has the value that is greater than a value associated with the first data entry and the value that is greater than the second data entry, the processing resource can write the third data entry to an address location 218 of the memory resource 216 that is physically located between the address location of the memory resource to which the second data entry is written and the last physical address of the memory resource 216. Conversely, in response to a determination that the third data entry has the value that is less than the value associated with the first data entry and the value that is less than the second data entry, the processing device can write the third data entry to an address location 218 of the memory resource 216 that is physically located between the address location of the memory resource to which the first data entry is written and the first physical address of the memory resource 216.

Figure 9:
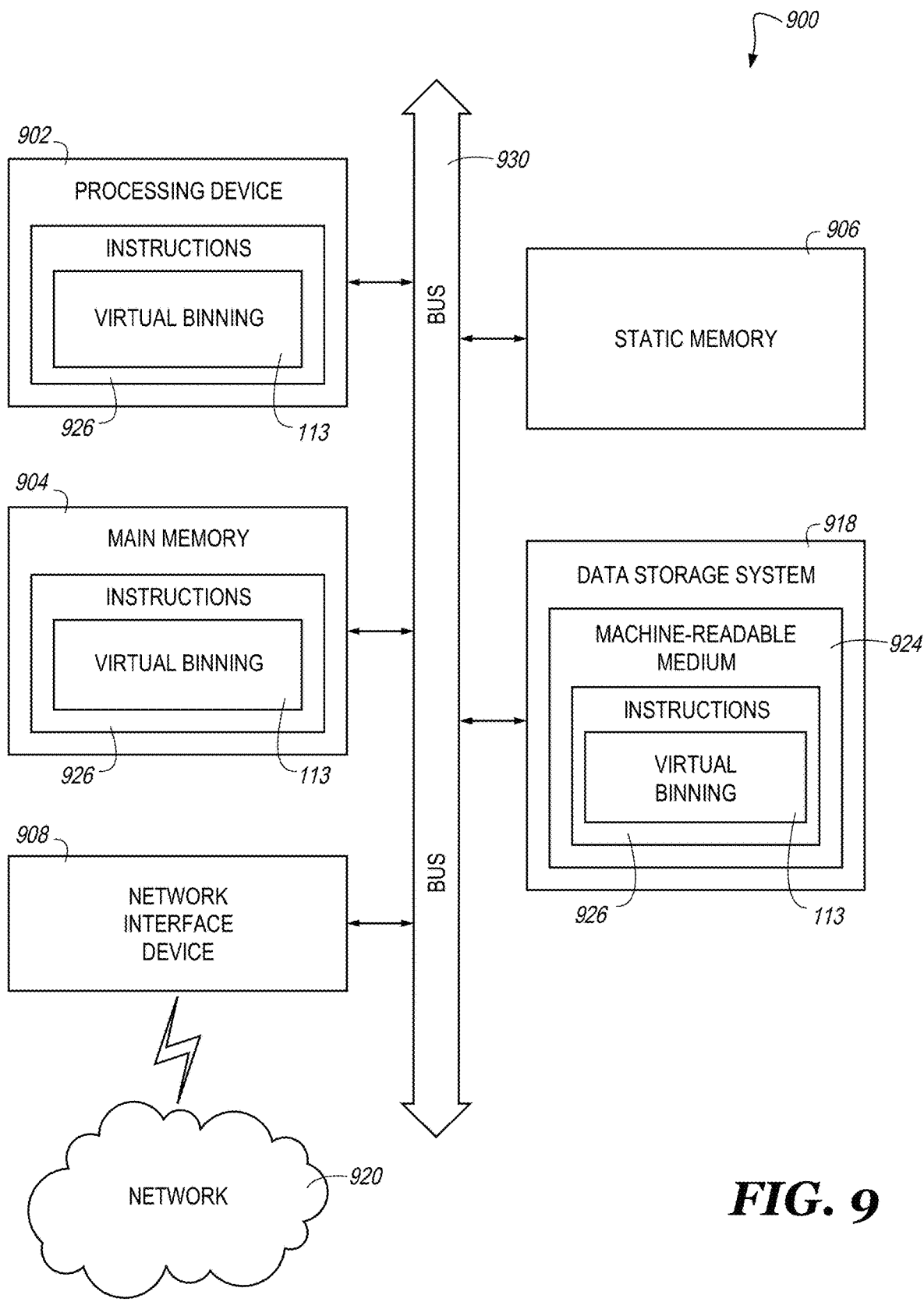
FIG. 9 is a block diagram of an example computer system in which embodiments of the present disclosure may operate.

In another non-limiting example, a non-transitory computer-readable storage medium (e.g., the machine-readable medium 924 illustrated in FIG. 9, herein) comprises instructions (e.g., the instructions 926 illustrated in FIG. 9, herein) that, when executed by a processing device (e.g., the virtual binning circuitry 213 and/or the processing device 902 illustrated in FIG. 9, herein), cause the processing device to write, to a memory resource 216 coupled to the processing device, a first data entry to an address location 218 that is substantially equidistant between a first physical address 218-1 of the memory resource and a last physical address 218-N of the memory resource 216. The processing device can then (1) write, to the memory resource, a second data entry to an address location 218 that is physically located between the first physical address of the memory resource and the address location to which the first data entry is written when the second data entry has a value that is less than a value of the first data entry or (2) write, to the memory resource 216, the second data entry to an address location 218 that is physically located between the address location to which the first data entry is written and the last physical address of the memory resource 216 when the second data entry has a value that is greater than the value of the first data entry.

Continuing with this non-limiting example, the instructions can be further executed by the processing device to determine that the second data entry has the value that is less than the value of the first data entry and (1) write, to the memory resource 216, a third data entry to an address location 218 that is physically located between the first physical address of the memory resource 216 and the address location to which the second data entry is written when the third data entry has a value that is less than the second data entry or (2) write, to the memory resource 216, the third data entry to an address location that is physically located between the address location to an address location 218 that is physically located between the address location to which the first data entry is written and the address location to which the second data entry is written when the third data entry has a value that is greater than the second data entry.

Embodiments are not so limited, and in some embodiments, the instructions can be further executed by the processing device to determine that the second data entry has the value that is greater than the value of the first data entry and (1) write, to the memory resource 216, a third data entry to an address location 218 that is physically located between the address location to which the first data entry is written and the address location to which the second data entry is written when the third data entry has a value that is less than the second data entry or (2) write, to the memory resource 216, a third data entry to an address location 218 that is physically located between the address location to which the second data entry is written and the last physical address of the memory resource 216 when the third data entry has a value that is greater than the second data entry.

As described in more detail, herein the instructions can be further executed by the processing device to cause the processing device to write the first data entry, the second data entry, or one or more subsequent data entries, or any combination thereof, to the memory resource in a data structure 232. For example, the instructions can be further executed by the processing device to cause the processing device to write the first data entry, the second data entry, or one or more subsequent data entries, or any combination thereof, to the memory resource as part of an operation to write logical-physical mapping information associated with a memory sub-system 210 in which the memory resource 216 is deployed.

In some embodiments, the instructions can be further executed by the processing device to cause the processing device to receive a command to locate a particular data entry that has been written to the memory resource 216. In such examples, the particular data entry can be one of the first data entry, the second data entry, or a subsequently written data entry that is stored within the memory resource 216. The instructions can further be executed by the processing device to cause the processing device to perform a binary search involving each data entry that has been written to the memory resource 216 to locate the particular data entry.

FIGS. 3A-3H illustrate an example of a series of operations that can be performed utilizing a center allocation data structure 332 in accordance with some embodiments of the present disclosure. In the non-limiting example illustrated in FIGS. 3A-3E, a series 322 (e.g., a vector) of data entries [51, 7, 300, 12, 3] are written to address locations 318-1, 318-2, 318-3, 318-4, 318-5, 318-6, 318-7, 318-8 to 318-9 of a memory resource 316. In the non-limiting example illustrated in FIGS. 3F-3H, data entries are written to the memory resource 316 subsequent to the series 322 of data entries being written to the memory resource 316 to illustrate how the center allocation data structure 322 of the present disclosure handles several scenarios that can occur subsequent to the series 322 of data entries being written to the memory resource 316. In the non-limiting example illustrated in FIGS. 3A-3H, the data entries are organized in the center allocation data structure 332 such that the data entries are ordered in an ascending order from data entries that have a lowest numerical value to data entries that have a highest numerical value. It will however be appreciated that embodiments are contemplated in which the data entries are organized in the center allocation data structure 332 such that the data entries are ordered in a descending order from data entries that have a highest numerical value to data entries that have a lowest numerical value. It will further be appreciated that the non-limiting example shown in FIGS. 3A-3H is merely illustrative and is provided to clarify operations that can be performed using the center allocation data structure 322 of the present disclosure. Accordingly, embodiments are not limited to the particular non-limiting example illustrated in FIGS. 3A-3H.

The memory resource can be analogous to the memory resource 218 illustrated in FIG. 2, herein and the address locations 318 can be analogous to the address locations 218 illustrated in FIG. 2, herein. Accordingly, the address location 318-1 can be referred to as a "first physical address," a "zeroth address location," or a "lowermost physical location" of the memory resource 316, while the address location 318-9 can be referred to as a "last physical address," an "$N^{th}$ address location," or an "uppermost physical location" of the memory resource 316. In the example illustrated in FIGS. 3A-3H, the address location 318-5 represents an address location that is at the center of the address space (e.g., the address space 235 illustrated in FIG. 2, herein) and can be referred to as an address location of the memory device that is substantially physically equidistant from the first physical address 318-1 of the memory resource 316 and the last physical address 318-9 of the memory resource 316.

Figure 3A:
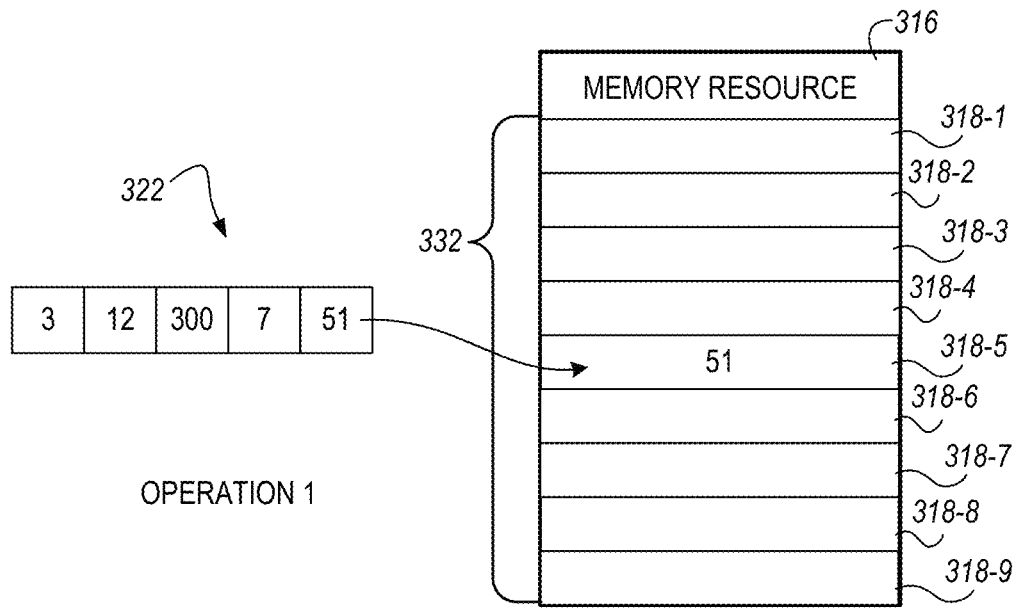
FIGS. 3A-3H illustrate an example of a series of operations that can be performed utilizing a center allocation data structure in accordance with some embodiments of the present disclosure.

In FIG. 3A, a first operation is performed to write the first data entry (51) to the memory resource 316. The first operation (as well as the subsequent operations described in connection with FIGS. 3A-3H) can be controlled by a processing device (e.g., the virtual binning circuitry 113/213 illustrated in FIG. 1 and FIG. 2, herein and/or the processor 117 illustrated in FIG. 1, herein). The first data entry (51) is written to an address location (e.g., the address location 318-5) of the memory resource 316 that is neither a first physical address (e.g., the address location 318-1) of the memory resource 316 nor a last physical address (e.g., the address location 318-9) of the memory resource 316. I.e., the first data entry (51) is written to an address location (e.g., the address location 318-5) of the memory resource 316 that is between a first physical address (e.g., the address location 318-1) of the memory resource 316 nor a last physical address (e.g., the address location 318-9) of the memory resource 316.

Figure 3B:
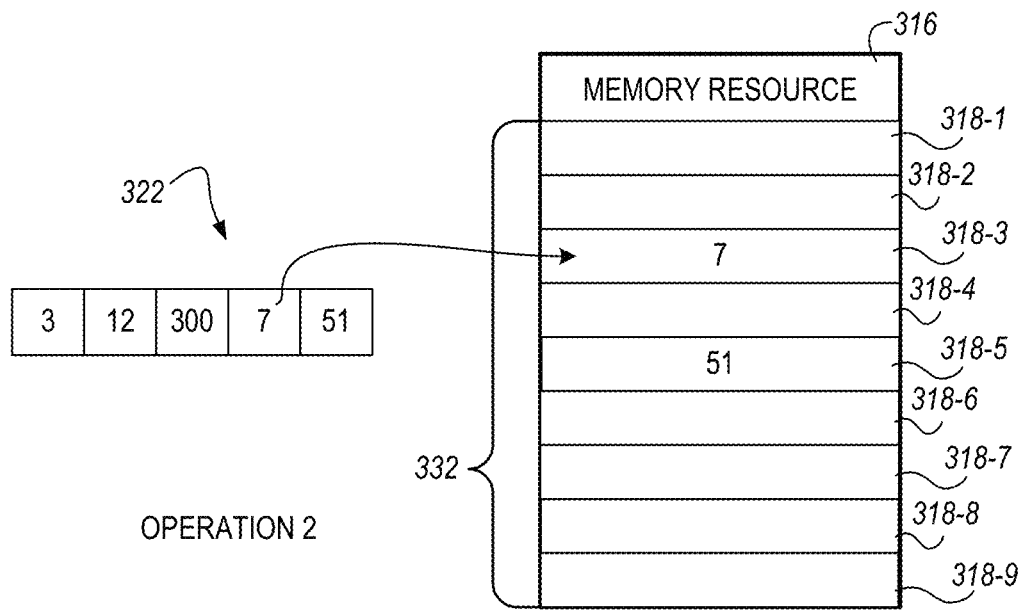

In FIG. 3B, a second operation is performed to write the second data entry (7), which has a lower numerical value than the first data entry (51), to the memory resource 316. As shown in FIG. 3B, the second data entry is written to an address location that is between the first physical address of the memory resource 316 and the address location to which the first data entry was written. Although not explicitly shown in FIG. 3B, in some embodiments, the second entry can be written to an address location that is immediately next to (e.g., the address location 318-4) the address location to which the first data entry is written.

Figure 3C:
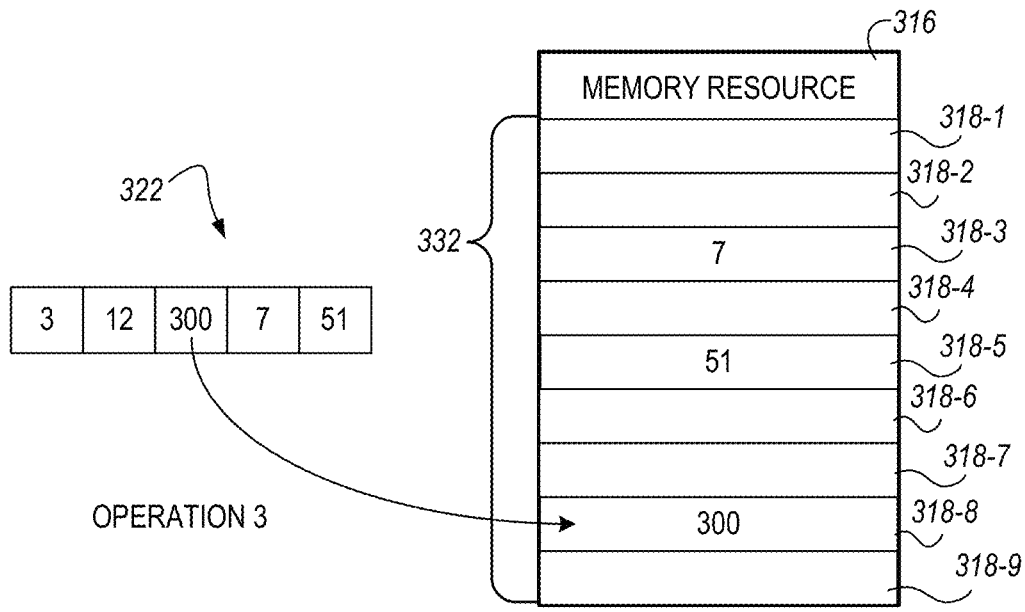

In FIG. 3C, a third operation is performed to write the third data entry (300), which has a higher numerical value than the first data entry (51), to the memory resource 316. As shown in FIG. 3C, the third data entry is written to an address location that is between the last physical address of the memory resource 316 and the address location to which the first data entry was written. Although not explicitly shown in FIG. 3C, in some embodiments, the second entry can be written to an address location that is immediately next to (e.g., the address location 318-6) the address location to which the first data entry is written.

Figure 3D:
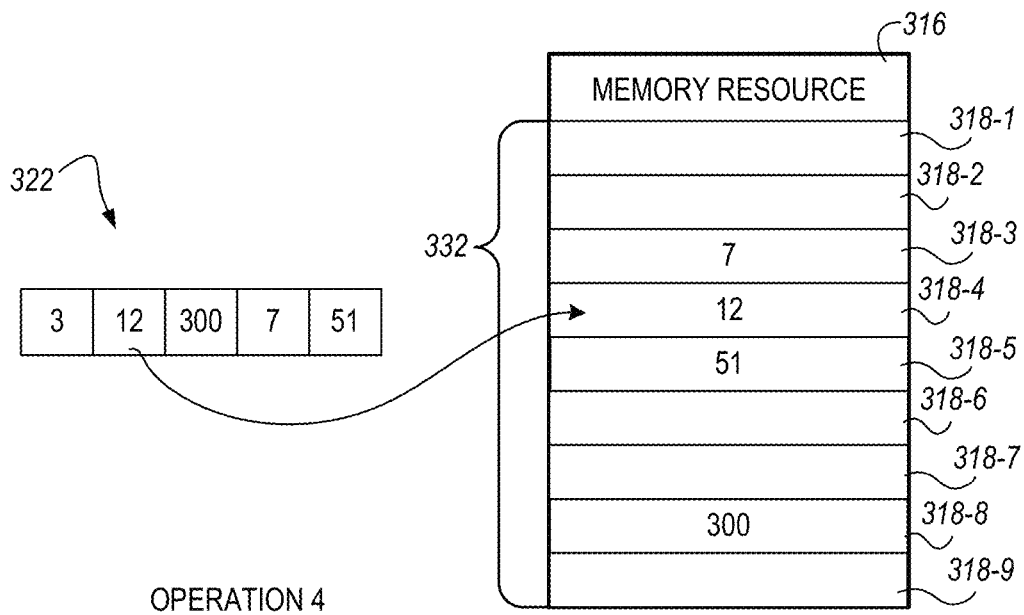

In FIG. 3D, a fourth operation is performed to write the fourth data entry (12), which has a higher numerical value than the second data entry (7) but a lower numerical value than the first data entry (51), to the memory resource 316. As shown in FIG. 3D, the fourth data entry is written to an address location that is between the address location to which the second data entry was written and the address location to which the first data entry was written. Although not explicitly shown in FIG. 3D, in some embodiments, the second data entry can be shifted (e.g., from the address location 318-4 to the address location 318-3 in embodiments in which the second data entry was written to the address location that is immediately next to the address location to which the first data entry is written to allow for the fourth data entry to be written to the address location 318-4). In such embodiments, however, even though the second data entry is shifted from one address location to another, an overall quantity of shifting operations within the memory resource 316 is reduced in comparison to the conventional approaches described above.

Figure 3E:
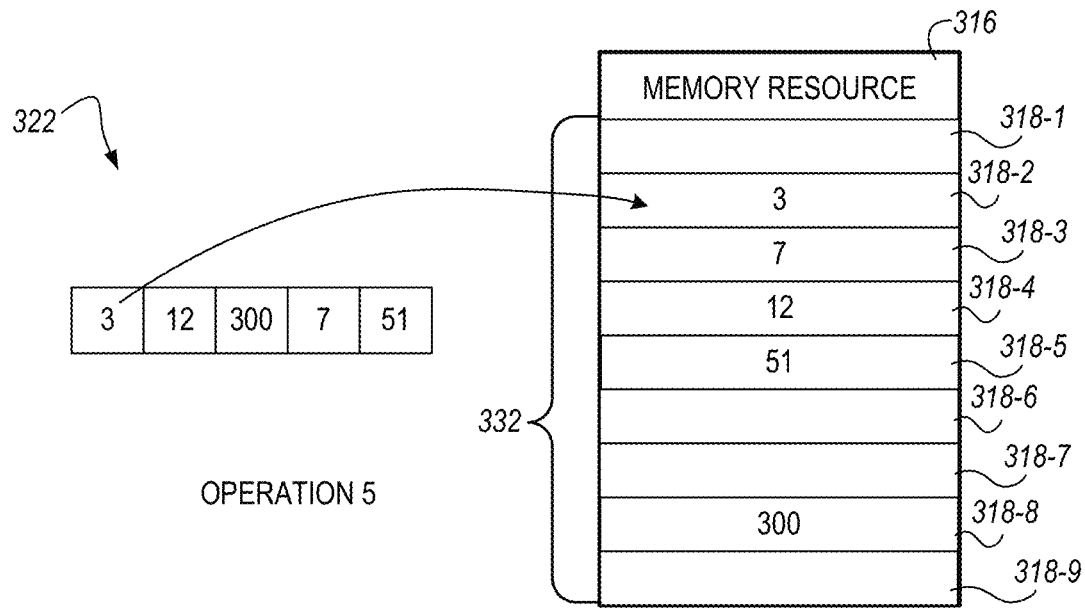

In FIG. 3E, a fifth operation is performed to write the fifth data entry (3), which has a lower numerical value than any of the previously written data entries, to the memory resource 316. As shown in FIG. 3E, the fifth data entry is written to an address location that is between the first physical address of the memory resource 316 and the address location to which the second data entry (which has the next largest numerical value) was written. In this manner, subsequent data entries can be written to the memory resource 316 while the data entries are maintained in the center allocation data structure 322 in an ordered manner.

Figure 3F:
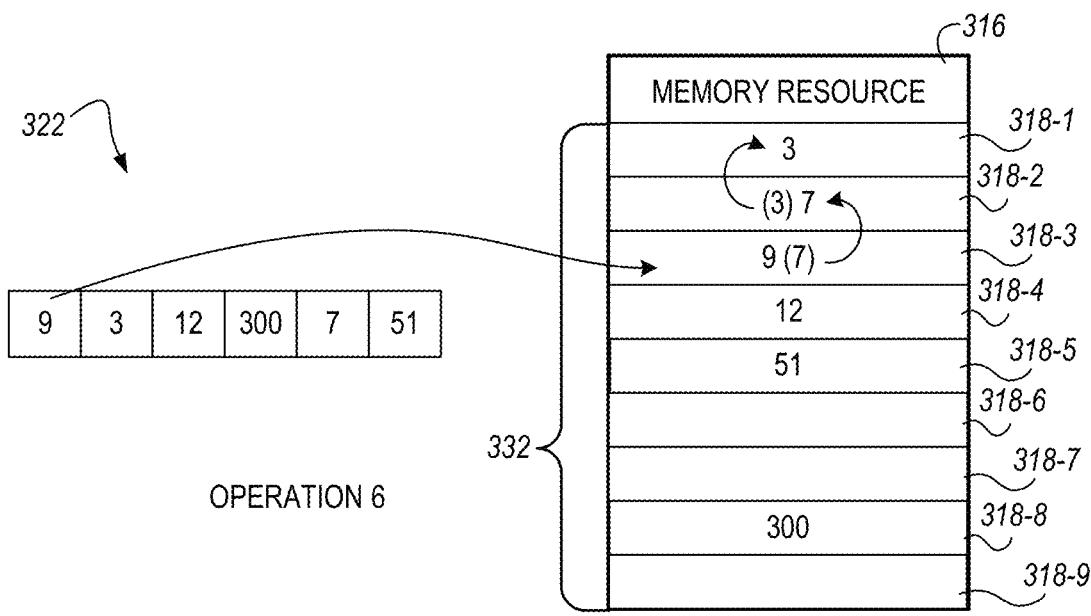
Figure 3G:
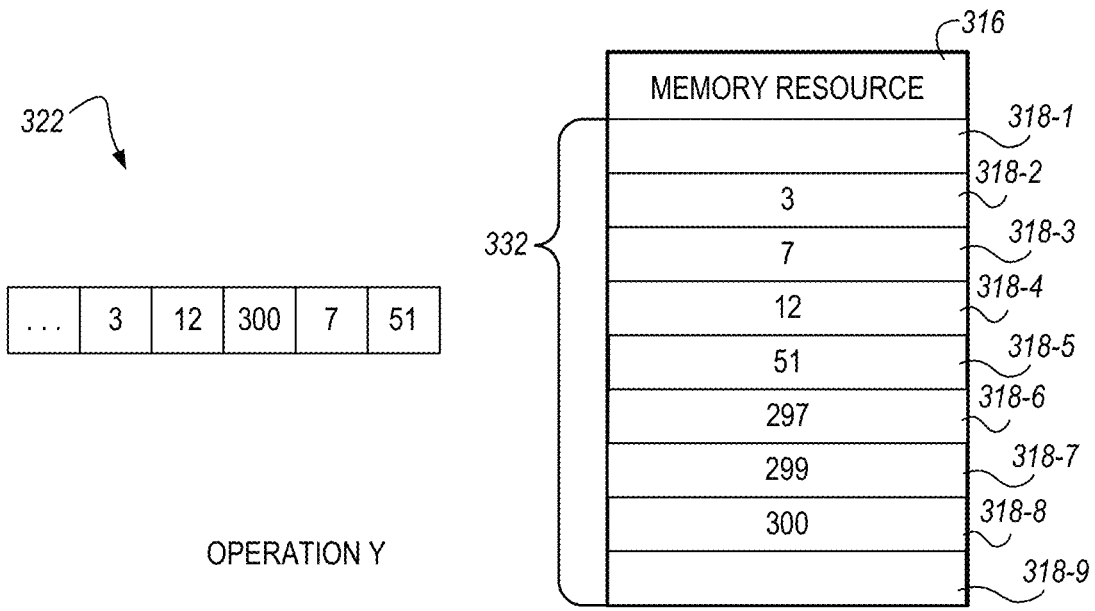

Continuing with this non-limiting example, FIG. 3F illustrates a scenario in which a sixth data entry (9) is written to the memory resource 316 after the first five data entries described in connection with FIGS. 3A-3E were written to the memory resource 316. The sixth data entry has a value that should come between the second data entry (7) and the fourth data entry (12); however, when the sixth data entry is ready to be written to the memory resource 316 there is not an available address location between the second data entry and the fourth data entry to write the sixth data entry to while preserving the ordered nature of the center allocated data structure 332. In this scenario, the fifth data entry (3) and the second data entry (7) are shifted toward the first physical address of the memory resource in order to open an address location (e.g., in order to open the address location 318-3) in which to write the sixth data entry (9). The process of shifting multiple data entries in order to open an address space for a subsequent data entry having a numerical value that lies between a group of data entries that are written to sequential address locations in the memory device 316 is referred to herein as a "batch shift operation" or a "batch shift" for brevity. Another scenario in which a batch shift operation can be performed is described below in connection with FIGS. 3F-3H.

Figure 3H:
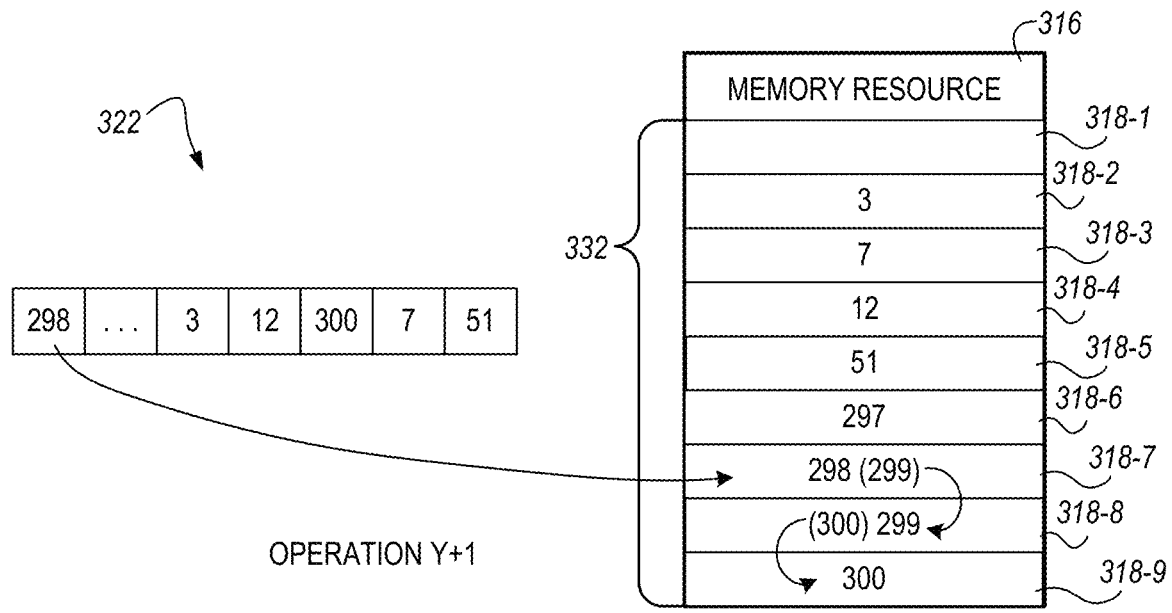

FIG. 3F illustrates the memory resource 316 and center allocation data structure 332 at a point in time after a $Y^{th}$ operation has been performed to write data entries to the memory resource 316 and the upper portion (e.g., the address locations above the address location to which the first data entry was written) are nearly full. Subsequently, as shown in FIG. 3H, a $Y+1^{th}$ operation is performed to write a data entry (298) to the memory resource 316. In order to write the data entry (298) to the memory resource 316 while maintaining the center allocation data structure 332 in an ordered manner, a batch shift operation involving the data entry (300) and the data entry (299) is performed to shift the data entry (300) from the address location 318-8 to the address location 318-9 (the last physical address in this non-limiting example) and to shift the data entry (299) from the address location 318-7 to the address location 318-8. This batch shift operation opens the address location 318-7, and, as shown in FIG. 3H, the data entry (298) is written to the address location 318-7, thereby maintaining the ordered nature of the center allocation data structure 332.

Although not explicitly shown in FIGS. 3A-3H, if a data entry that has a higher (or lower) value than the largest (or smallest) data entry written to the data structure 332, the contents of the data structure 332 can be shifted accordingly to free up an address location to write the data entry to. For example, if, when the data structure is filled as illustrated in FIG. 3H, a subsequent data entry arrives that has a greater value than any of the data entries in the data structure 332 (e.g., a data entry with a value of (305)), the contents of the data structure 332 can be shifted toward the first physical address 318-1 to allow for the data entry (305) to be written to the data structure 332. That is, the data entry (3) can be shifted to the address location 318-1, the data entry (7) can be shifted to the address location 318-2, the data entry (12) can be shifted to the address location 318-3, the data entry (51) can be shifted to the address location 318-4, the data entry (297) can be shifted to the address location 318-5, the data entry (298) can be shifted to the address location 318-6, the data entry (299) can be shifted to the address location 318-7, and the data entry (300) can be shifted to the address location 318-8. The new data entry (305) can then be written to the address location 318-9. It will be appreciated that similar operations can be performed in the event that a data entry has a value that is lower than the other data values in the data structure 332 is received when data values are written to the lowermost physical location of the data structure 332.

One of the main advantages of maintaining the ordered nature of the center allocation data structure 332 is to allow for utilization of binary searching (which is also referred to as logarithmic searching) in order to locate specific data entries within the center allocation data structure 332. As will be appreciated, binary searching is a technique in which a search interval used to search for particular entries in a sorted (e.g., ordered) data structure is repeatedly divided in half. This technique allows for minimization of search queries in an ordered data structure as the search interval generally converges rapidly to locate the particular data entry.

Figure 4:
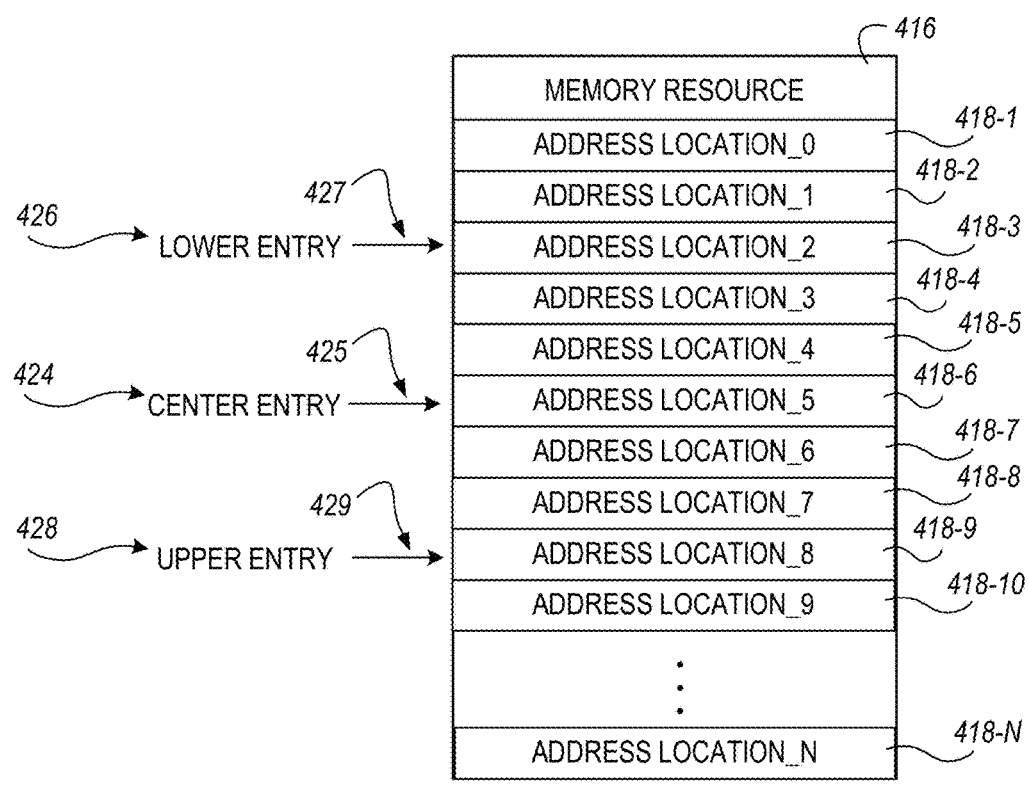
FIG. 4 illustrates an example of a memory resource having a plurality of address locations in accordance with some embodiments of the present disclosure.

FIG. 4 illustrates an example of a memory resource 416 having a plurality of address locations 418-1 to 418-N in accordance with some embodiments of the present disclosure. The memory resource 416 can be analogous to the memory resource 216/316 illustrated in FIG. 2 and FIGS. 3A-3H, herein, and the address locations can be analogous to the address locations 218/318 illustrated in FIG. 2 and FIGS. 3A-3H, herein. In FIG. 4, a center entry 424, a lower entry 426, and an upper entry 428 are illustrated. Each of these entries corresponds to a data entry that has been written to the memory resource 416 and has a respective pointer 425, 427, and 429 associated therewith.

For example, the center entry 424 can correspond to a first data entry that is written to the memory resource 416, e.g., a data entry that is written to an address location, in this case the address location 418-6, that is equidistant from a first physical address 418-1 and a last physical address 418-N. The pointer 425 can be assigned to this address location to indicate where the center data entry is written in the memory resource 416.

The lower pointer 427 can be assigned to an address location in which the lower entry 426, e.g., the data entry that, for an ordered ascending data structure (e.g., the data structure 232 illustrated in FIG. 2 and/or the center allocation data structure 332 illustrated in FIGS. 3A-3H, herein) has a lowest value and is therefore physically closest to the first physical address 418-1, is written. Similarly, the upper pointer 429 can be assigned to an address location in which the upper entry 428, e.g., the data entry that, for an ordered ascending data structure has a highest value and is therefore physically closest to the last physical address 418-N, is written.

The pointers 425, 427, and 429 can be dynamically moved as the memory resource is filled with data entries. For example, the pointer 425 can be moved to align with the center entry 424 (e.g., with the data entry that is equidistant from the upper entry 426 and the lower entry 428), while the lower pointer 427 and the upper pointer 429 can, for an ordered ascending data structure, be moved to align with the data entry that has the lowest numerical value and the data entry that has the highest numerical value, respectively. It will be appreciated that, for an ordered descending data structure, the lower pointer 427 and the upper pointer 429 can be moved to align with the data entry that has the lowest numerical value and the data entry that has the highest numerical value, respectively.

The pointers 425, 427, and 429 can be used in connection with determining an address location 418 in the data structure to write data entries. For example, the pointer 427 can be checked to determine a numerical value of a data entry written to the address location associated with the lower entry 426 to determine if a data entry that is to be written to the memory resource 416 has a greater numerical value or a lesser numerical value than the value of the data entry written to the address location associated with the lower entry 426. If the numerical value of the data entry that is to be written to the memory resource 416 is less than the numerical value of the data entry written to the address location associated with the lower entry 426, the data entry that is to be written to the memory resource 416 can be written to an address location that is physically closer to the first physical address of the memory resource (for an ordered ascending data structure) and the pointer 427 can be moved to point to the newly written data entry.

Similarly, the pointer 429 can be checked to determine a numerical value of a data entry written to the address location associated with the upper entry 428 to determine if a data entry that is to be written to the memory resource 416 has a greater numerical value or a lesser numerical value than the value of the data entry written to the address location associated with the upper entry 428. If the numerical value of the data entry that is to be written to the memory resource 416 is greater than the numerical value of the data entry written to the address location associated with the upper entry 428, the data entry that is to be written to the memory resource 416 can be written to an address location that is physically closer to the last physical address of the memory resource (for an ordered ascending data structure) and the pointer 429 can be moved to point to the newly written data entry.

Figure 5A:
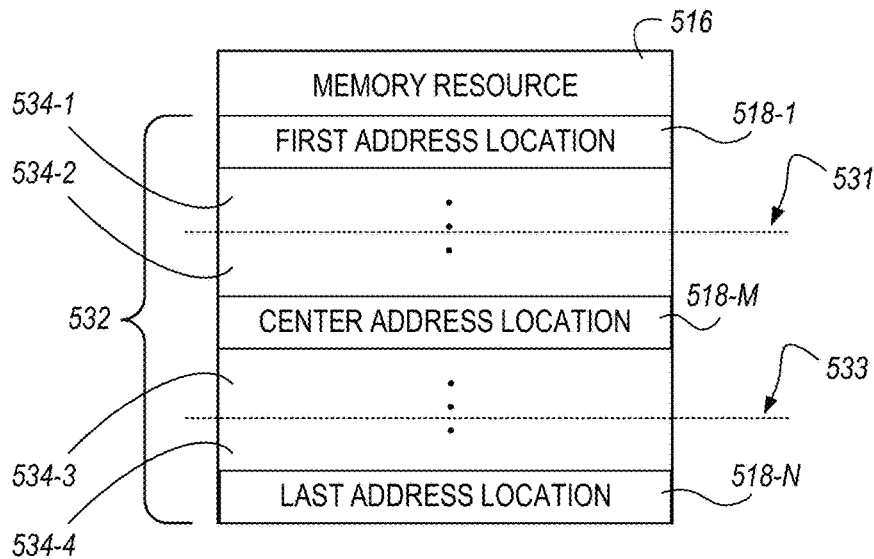
FIGS. 5A-5B illustrate additional examples of a memory resource having a plurality of address locations in accordance with some embodiments of the present disclosure.
Figure 5B:
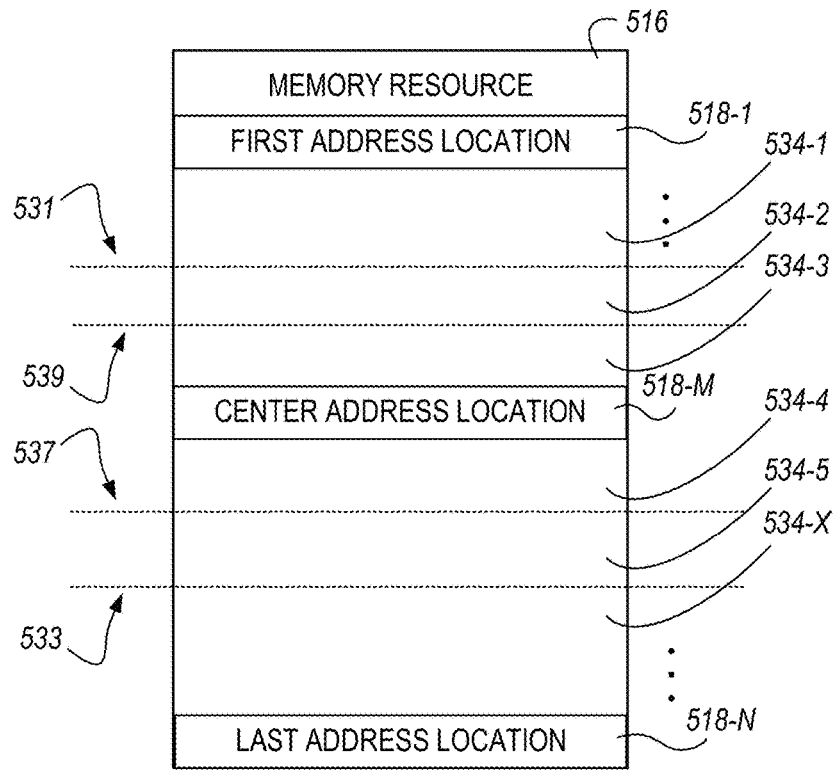

FIGS. 5A-5B illustrate additional examples of a memory resource 516 having a plurality of address locations 518-1 to 518-N in accordance with some embodiments of the present disclosure. The memory resource 516 can be analogous to the memory resource 216/316/416 illustrated in FIG. 2, FIGS. 3A-3H, and FIGS. 4A-4B, herein, and the address locations can be analogous to the address locations 218/318 illustrated in FIG. 2, FIGS. 3A-3H, and FIGS. 4A-4B, herein. The examples illustrated in FIGS. 5A-5B show various ways in which the data structure 532 of the memory resource 516 can be divided either as part of performing operations, such as the operations illustrated in FIGS. 3A-3H, to write data entries to the memory resource 516 and/or as part of performing a binary search operation to retrieve a particular data entry from the memory resource 516.

The center address location 518-M corresponds to a physical address location that is substantially equidistant from the first physical address 518-1 and the last physical address 518-N. As discussed in connection with FIG. 4, above, the physical address location that contains a data entry that has a numerical value that is in the middle of all the numerical values can move or shift over time as the memory resource 516 is filled with data entries, however, the physical address location corresponding to the center address location 518-M remains fixed. The first physical address 518-1 and the last physical address 518-N, however, remain fixed as will be appreciated (the pointers discussed in connection with FIG. 4, remain dynamic and can be moved or shifted as discussed in connection with FIG. 4).

In FIG. 5A, an address space (e.g., the address space 235 illustrated in FIG. 2, herein) of the memory resource 516 is divided into a plurality of addressable memory zones 534-1, 534-2, 534-3, and 534-4. As shown in FIG. 5A, these divisions are made between the dashed lines 531 and 533. In some embodiments, the dashed line 531 represents a physical location in the memory resource 516 that is substantially equidistant from the center address location 518-M and the first address location 518-1. Similarly, the dashed line 533 represents a physical location in the memory resource 516 that is substantially equidistant from the center address location 518-M and the last address location 518-N.

In some embodiments, data entries that are written to the memory resource 516 subsequent to writing of a first data entry that is written to the center address location 518-M can be written to one of the addressable memory zones 534-1, 534-2, 534-3, and 534-4 based on whether the data entry has a value is greater than or less than a value of the data entry that is written to the center address location 518-M. Further, as described above in connection with FIGS. 3A-3H, each subsequent data entry can be written to one of the addressable memory zones 534-1, 534-2, 534-3, and 534-4 based on the relative values of the data entries written to the memory resource 516.

In addition to, or in the alternative, the addressable memory zones 534-1, 534-2, 534-3, and 534-4 can correspond to zones (e.g., sections) of the memory resource 516 that are searched as part of a binary searching operation to locate and/or retrieve a particular data entry from the memory resource 516. For example, is a particular data entry is requested, the memory resource 516 can be divided into multiple addressable memory zones 534-1, 534-2, 534-3, and 534-4 to facilitate performance of a binary searching operation.

In FIG. 5B, the address space (e.g., the address space 235 illustrated in FIG. 2, herein) of the memory resource 516 is divided into a plurality of addressable memory zones 534-1, 534-2, 534-3, 534-4, 534-5 to 535-X. As shown in FIG. 5A, these divisions are made between the dashed lines 531, 539, 533, and 537 to further divide the memory resource 516 into a greater quantity of addressable memory zones 534-1 to 534-X than are shown in FIG. 5A. In some embodiments, the dashed line 531 represents a physical location in the memory resource 516 that is substantially equidistant from the center address location 518-M and a physical address that is substantially equidistant between the first address location 518-1 and the center address location 518-M. Similarly, the dashed line 533 represents a physical location in the memory resource 516 that is substantially equidistant from the center address location 518-M and a physical address that is substantially equidistant between the last address location 518-N and the center address location 518-M. The dashed lines 537 and 539 can represent physical locations in the memory resource 516 that are substantially equidistant between the dashed lines 531 and 533, respectively, and the center address location 518-M. It will be appreciated that the memory resource 516 can be further divided into additional addressable memory zones 534 that are not explicitly illustrated in FIGS. 5A-5B.

As discussed above in connection with FIG. 5A, the addressable memory zones 534-1 to 534-X can correspond to regions of the memory resource 516 to which data entries are written over time as the memory resource 516 is filled with data entries. In addition to, or in the alternative, the addressable memory zones 534-1 to 534-X can correspond to zones (e.g., sections) of the memory resource 516 that are searched as part of a binary searching operation to locate and/or retrieve a particular data entry from the memory resource 516.

Figure 6:
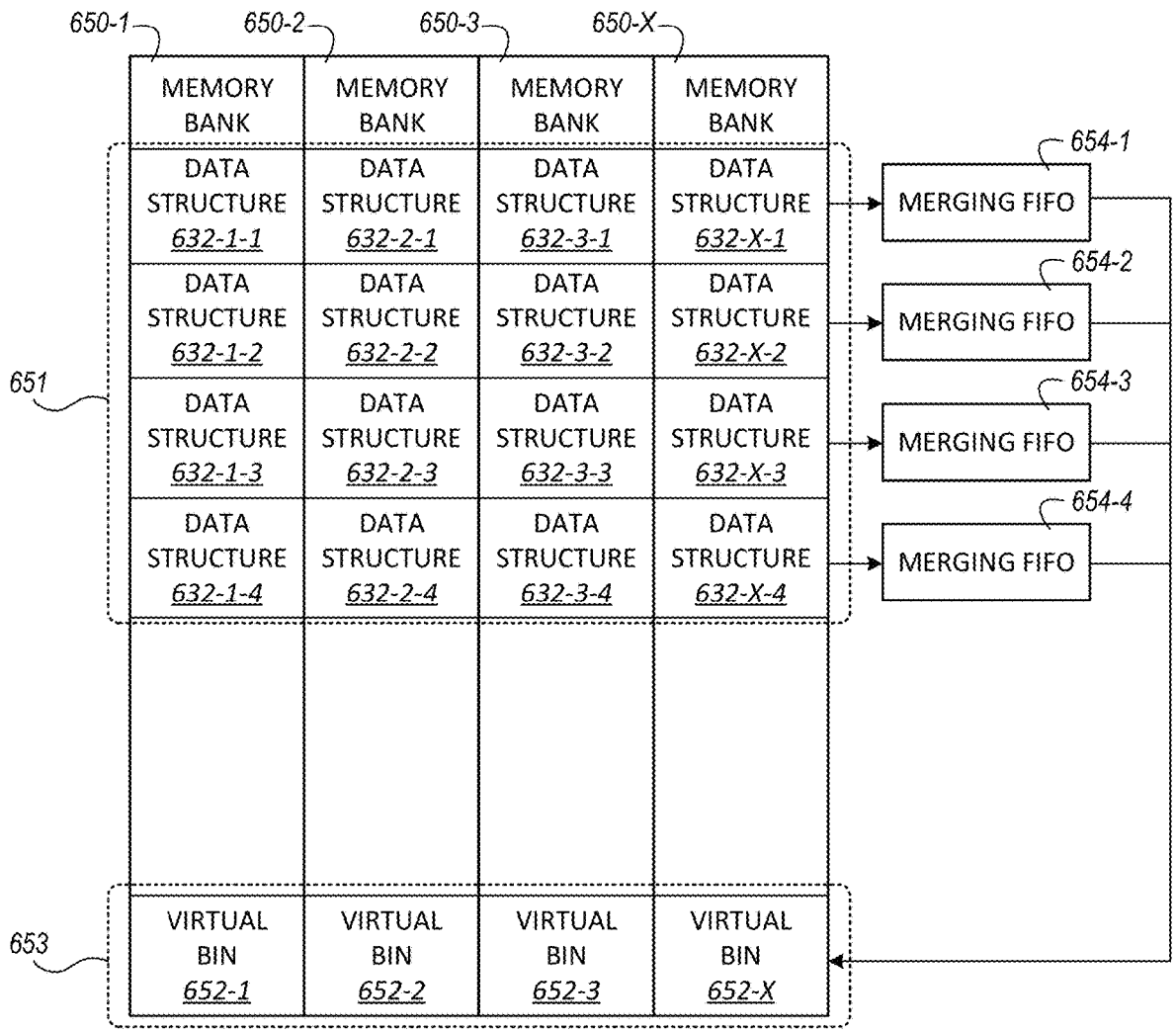
FIG. 6 illustrates an example of memory banks of a memory device in accordance with some embodiments of the present disclosure.
Figure 7A:
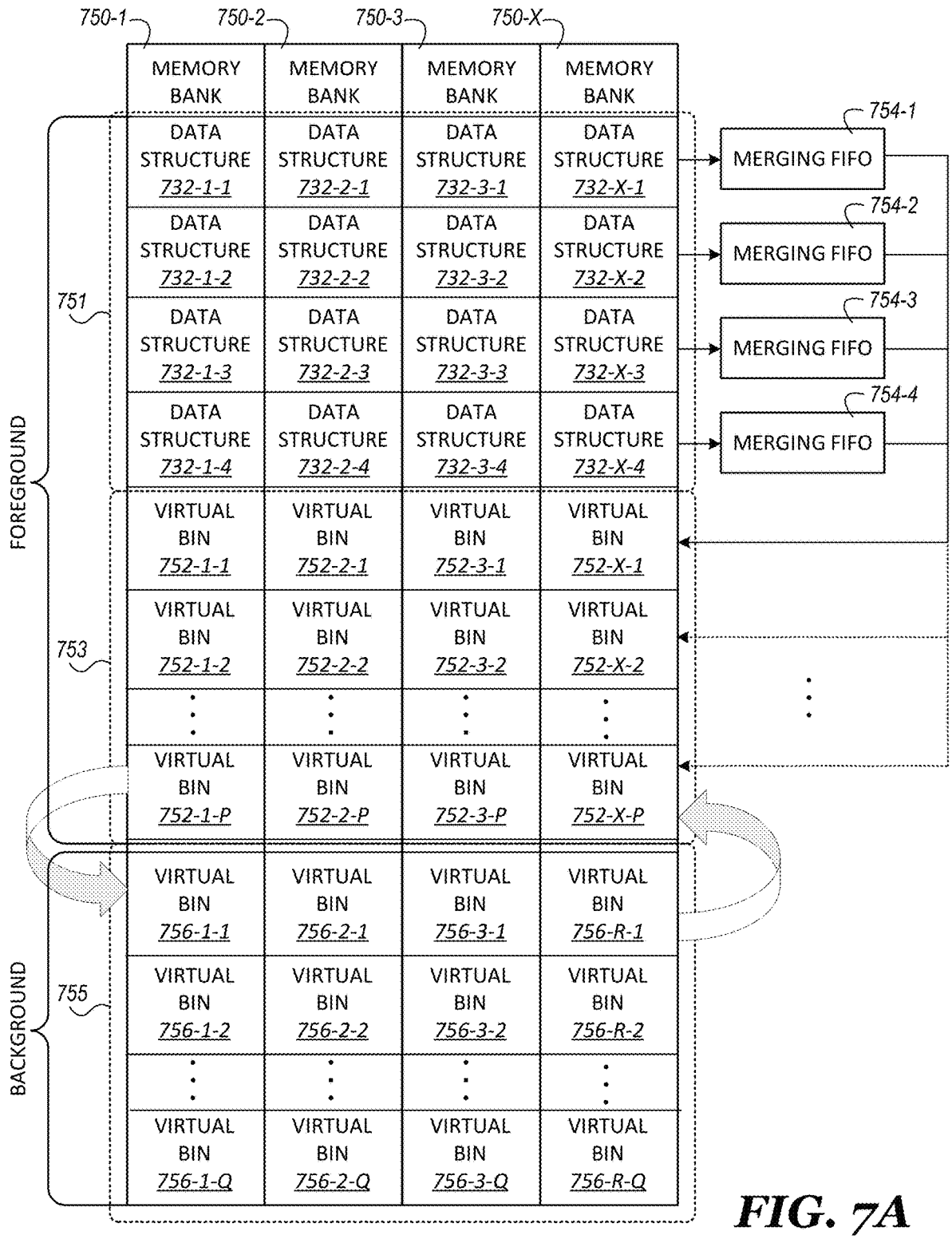
FIGS. 7A-7B illustrate additional examples of memory banks of a memory device in accordance with some embodiments of the present disclosure.
Figure 7B:
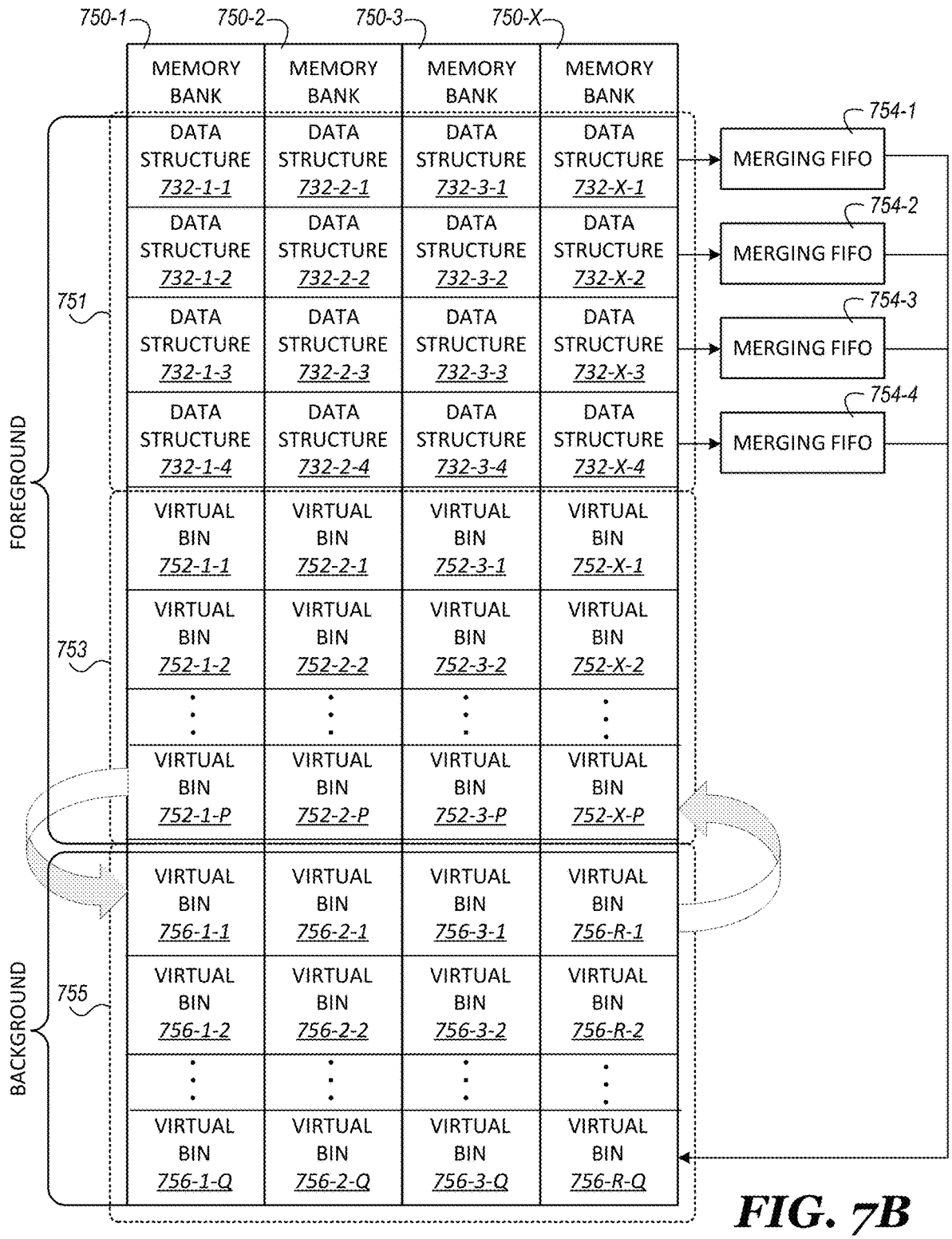

FIGS. 6 and 7A-7B generally illustrate memory banks that have data entries written and stored as data structures within areas of a memory device and/or within a memory resource. As described herein, the data structures can be configured to store ordered or un-ordered data entries that can be written sequentially, in accordance with a center allocation data structure policy, randomly, or otherwise. As will be described in more detail below, some of the data structures can be written to physical memory locations in a foreground portion of a memory device (e.g., to a physically addressed memory location) for a period of time and then, when multiple such data structures are filled with data entries, they can be transferred, moved, and/or merged into virtual memory locations (e.g., to a virtually addressed memory location) in a foreground and/or background portion of the memory device. As the virtual memory locations in the foreground become filled, they can be readdressed to a background portion of the memory device, as described above.

For example, in some embodiments, the data structures discussed in the disclosure (e.g., non-ordered data structures, ordered data structures, center allocation data structures, etc.) are written in a memory area or memory resource of a memory device that contains physical address locations. Once the data structure contains greater than or equal to a threshold quantity of data entries (e.g., once the data structure is filled such that there are no remaining address locations available to write data to in the data structure), the contents of the data structure can be moved (e.g., copied or otherwise relocated) to a memory area of the memory device that contains virtual address locations. A set of virtual address locations associated with the memory are that contains the virtual address locations can be referred to herein as a "bin" and multiple bins (e.g., sets of virtual address in the memory area that contains the virtual addresses) can be provided in the memory area that contains the virtual addresses.

As described in more detail herein, multiple data structures can be written to respective portions of a bin in the memory area of the memory device that contains virtual address locations in response to the data structures containing greater than or equal to the threshold quantity of data entries. This process can be repeated until the bin contains greater than or equal to a threshold quantity of data structures (e.g., once the bin is filled such that there are no remaining address locations available to write data to in the bin). Once the data structures have been written to the bin (e.g., to respective portions of the bin), new data entries can be written to the data structures by, for example, overwriting the previously written data structures until the data structures once again contain greater than or equal to the threshold quantity of data entries. The contents of these data structures can then be written to respective portions of a different bin in the memory area or memory resource of the memory device that contains virtual address locations and so on and so forth. By writing the contents of the data structures to the bins in the memory area of the memory device that contains virtual address locations, the data entries associated with the data structures can be preserved for future use (e.g., for future retrieval).

In some embodiments, the data structures and the bins that contain the contents of previously filled data structures can be stored in a foreground portion of the memory device. Over time, as more bins are filled with contents of subsequently filled data structures, these bins can be moved to virtual addresses locations that are in a background portion of the memory device. In some embodiments, this relocation of the filled bins from the foreground to the background of the memory device can be accomplished by readdressing (e.g., altering the virtual addresses of) the bins such that the addresses associated with the contents of the bins lie within the background of the memory device as opposed to rewriting the contents of the bins to different bins in the background region of the memory device.

FIG. 6 illustrates an example of memory banks 650-1 to 650-X of a memory device in accordance with some embodiments of the present disclosure. The memory banks 650-1, 650-2, 650-3 to 650-X can be banks of memory cells that are resident on a memory device, such as the memory device 130 and/or the memory device 140 illustrated in FIG. 1, herein. As a result, the memory banks 650-1, 650-2, 650-3 to 650-X can be resident on a memory sub-system, such as the memory sub-system 210 illustrated in FIG. 2, herein. The memory banks 650-1 to 650-X can include multiple memory areas 651 and 653. In some embodiments, the memory area 651 includes physical memory addresses (e.g., address locations) and the memory area 653 includes virtual memory addresses (e.g., address locations). The memory banks 650-1, 650-2, 650-3 to 650-X can include one or more memory resources (e.g., groups of memory cells) that can be analogous to the memory resources 216/316/416/516 discussed above.

It is noted that the numbering convention illustrated in FIG. 6, as well as FIGS. 7A—7B, herein indicated the reference element followed by a hyphen indicating the respective memory bank 650 associated with the reference element followed by a hyphen indicating the number of the reference element with respect to other reference elements shown in the Figures. For example, the reference element number "632-3-2" indicates a second data structure associated with the third memory bank of the memory device.

As shown in FIG. 6, each memory bank 650-1 to 650-X includes a plurality of data structures 632 (i.e., the data structures, 632-1-1, 632-1-2, 632-1-3 to 632-1-4, 632-2-1, 632-2-2, 632-2-3 to 632-2-4, 632-3-1, 632-3-2, 632-3-3 to 632-3-4, and 632-X-1, 632-X-2, 632-X-3 to 632-X-4), which can be analogous to the data structure(s) 232/332 illustrated in FIG. 2 and FIGS. 3A 3H, herein. The individual data structures 632 and/or the memory area 651 can be analogous to the memory resource 216/316/416/516 illustrated in FIGS. 2, 3A—3H, 4, and/or 5A—5B, herein, and may be referred to as a "first memory resource," herein given the context of the disclosure. Accordingly, the data structures 632 illustrated in FIG. 6 can be center allocation data structures that are operated in accordance with the discussion provided above in connection with FIGS. 2, 3A-3H, 4, and 5A-5B.

Further, as illustrated in FIG. 6, the memory area 653 includes a plurality of virtual bins 652-1, 652-2, 652-3 to 652-X (which can be referred to collectively as the "virtual bins 652," herein). As described above, a "virtual bin" generally refers to a set, subset, or other grouping of virtual address locations associated with the memory device that contain virtual address locations within the memory device in contrast with the data structures 632, which generally contain physical address locations within the memory device. The collection of virtual address (or portions thereof) that span the virtual bins 652 within the memory area 653 can be referred to herein in the alternative as a "memory resource" and, given the context of the disclosure, as a "second memory resource," herein.

In some embodiments, the virtual bins 652 can be configured to store the contents (e.g., the data entries) of four filled data structures 632 within a particular memory bank 650. For example, the contents of the data structures 632-1-1, 632-1-2, 632-1-3, and 632-1-4 can, once it is determined that the data structures 632-1-1, 632-1-2, 632-1-3, and 632-1-4 contain greater than or equal to a threshold quantity of data entries, be written to the virtual bin 652-1, which is associated with the memory bank 650-1.

Similarly, the data structures 632-X-1, 632-X-2, 632-X-3, and 632-X-4 can, once it is determined that the data structures 632-X-1, 632-X-2, 632-X-3, and 632-X-4 contain greater than or equal to a threshold quantity of data entries, be written to the virtual bin 652-X. Embodiments are not limited to writing of the contents of the data structures 632 to the respective virtual bins 652 in response to all of the data structures 632 associated with a particular memory bank 650 containing greater than or equal to a threshold quantity of data entries. For example, in some embodiments, the contents of a particular data structure (e.g., the data structure 632-2-2) can be written to a portion of a virtual bin (e.g., the virtual bin 652-2) within a particular memory bank (e.g., the memory bank 650-2) prior to the remaining data structures (e.g., the data structures 632-2-1, 632-2-3, and 632-2-4) associated with the particular memory bank (i.e., the memory bank 650-2 in this example) containing greater than or equal to the threshold quantity of data entries. However, the respective virtual bins 652 are generally maintained within the memory area 653 and/or within the foreground area of the memory device (as discussed in more detail in connection with FIGS. 7A-7B, herein) until all of the contents of the data structures (e.g., the data structures 632-2-1, 651-2-2, 632-2-3, and 632-2-4) associated with the particular memory bank (i.e., the memory bank 650-2 in this example) are written to the respective virtual bins (i.e., the virtual bin 652-2 in this example).

In some embodiments, merging first-in first-out (FIFOs) 654-1, 654-2, 654-3 to 654-4 (referred to herein collectively as the "merging FIFOs" 654) are provided to facilitate writing of the contents of the data structures 632 to the virtual bins 652. The merging FIFOs 654 can include hardware circuitry and/or can execute instructions to facilitate writing of the contents of the data structure 632 to respective virtual bins 652, as indicated by the arrows. For example, the merging FIFOS 654 can be configured to transfer, move, and/or merge multiple presorted (e.g., ordered) data structures 632 into one larger data structure to be written to a virtual bin 652.

In a non-limiting example, an apparatus (e.g., the memory sub-system 210 illustrated in FIG. 2) includes a first memory resource coupled to a second memory resource and a processing device coupled to the first memory resource and the second memory resource. The first memory resource can be analogous to the memory resource 216/316/416/516 illustrated in FIG. 2, FIGS. 3A-3H, FIG. 4, and/or FIGS. 5A-5B, herein and/or the first memory resource can comprise at least a portion of physical memory (e.g., physical memory cells that are addressable as physical address locations) of a memory bank 650 and can be configured to store one or more data structures 632. In some embodiments, the second memory bank can comprise at least a portion of virtual memory (e.g., virtual memory cells that are addressable as virtual address locations) of a memory bank 650 and can be configured to store one or more virtual bins 652. In some embodiments, the first memory resource comprises (or is otherwise contained in) a first memory area 651 and the second memory resource comprises (or is otherwise contained within) a second memory area 653.

The processing device, which can be analogous to the virtual binning circuitry 113/213 illustrated in FIG. 1 and FIG. 2 and/or the processor 117 illustrated in FIG. 1, herein, can write data entries to a data structure 632 within the first memory resource by: (1) writing a first data entry to an address location of the first memory resource that is neither (e.g., is between) a first physical address of the first memory resource nor a last physical address of the first memory resource and (2) writing a plurality of subsequent data entries to respective physical addresses of the first memory resource based on, for each subsequent data entry, a relative numerical value of each subsequent data entry with respect to previously written data entries in the first memory resource.

The processing device can determine that the data structure 632 includes a threshold quantity of data entries. For example, the processing device can determine that the data structure 632 is full and does not have physical memory locations to receive additional data entries. The processing device can, in response to the determination that the data structure 632 includes a threshold quantity of data entries, write the contents of the data structure 632 to the second memory resource, as discussed in more detail in connection with FIGS. 7A-7B, herein.

Continuing with this non-limiting example, in some embodiments, prior to the data structure 632 including the threshold quantity of data entries, the first memory resource and the second memory resource operate in a foreground area (e.g., the foreground area illustrated in FIGS. 7A-7B, herein) of a memory device in which the memory resource and the second memory resource are deployed. Subsequent to the data structure 632 including the threshold quantity of data entries, the processing device is configured to move the data entries written to the second memory resource to a third memory resource (e.g., one or more of the virtual bins 756 illustrated in FIGS. 7A-7B, herein) that operates in a background area (e.g., the background area illustrated in FIGS. 7A-7B, herein) of the memory device. That is, in response to the second memory resource (e.g., a virtual bin 652/752) becoming full, the processing device can move the data entries stored in the second memory resource to a third memory resource (e.g., a virtual bin 756 illustrated in FIGS. 7A-7B) to free up space in the second memory resource and/or the second memory area 653 to receive data entries that are written to first memory resource at a later time.

In some embodiments, the processing device is configured to readdress data entries associated with the second memory resource to move the data entries written to the second memory resource to the third memory resource. For example, the processing device can be further configured to readdress data entries associated with the second memory resource to move the data entries written to the second memory resource to the third memory resource without rewriting the data entries written to the second memory resource to the third memory resource. That is, in some embodiments, the processing device can alter the virtual addresses of virtual address locations in the second memory resource such that the virtual addresses correspond to virtual addresses of the third memory resource without actually rewriting (e.g., without performing one or more program/erase cycles) the data entries contained in the second memory resource to the third resource.

FIGS. 7A-7B illustrate additional examples of memory banks 750-1 to 750-X of a memory device in accordance with some embodiments of the present disclosure. The memory banks 750-1, 750-2, 750-3 to 750-X can be banks of memory cells that are resident on a memory device, such as the memory device 130 and/or the memory device 140 illustrated in FIG. 1, herein. The memory banks 750-1 to 750-X can include multiple memory areas 751 and 753, which are in a foreground area of the memory device and a memory area 755, which is in a background area of the memory device. In some embodiments, the memory area 751 includes physical memory addresses (e.g., address locations) and the memory areas 753 and 755 include virtual memory addresses (e.g., address locations).

As shown in FIGS. 7A-7B, each memory bank 750-1 to 750-X includes a plurality of data structures 732 (i.e., the data structures, 732-1-1, 732-1-2, 732-1-3 to 732-1-4, 732-2-1, 732-2-2, 732-2-3 to 732-2-4, 732-3-1, 732-3-2, 732-3-3 to 732-3-4, and 732-X-1, 732-X-2, 732-X-3 to 732-X-4), which can be analogous to the data structure(s) 232/332/632 illustrated in FIG. 2, FIGS. 3A-3H, and FIG. 6, herein. The individual data structures 732 and/or the memory area 751 can be analogous to the memory resource 216/316/416/516 illustrated in FIGS. 2, 3A-3H, 4, and/or 5A-5B, and may be referred to as a "first memory resource," herein given the context of the disclosure. Accordingly, the data structures 732 illustrated in FIGS. 7A-7B can be center allocation data structures that are operated in accordance with the discussion provided above in connection with FIGS. 2, 3A-3H, 4, and 5A-5B.

As illustrated in FIGS. 7A-7B, the memory areas 753 and 755 include a plurality of virtual bins 752-1-1, 752-1-2 to 752-1-P, 752-2-1, 752-2-2 to 752-2-P, 752-3-1, 752-3-2 to 752-3-P, and 752-X-1, 752-X-2 to 752-X-P (which can be referred to collectively as the "virtual bins 752," herein). As described above, a "virtual bin" generally refers to a set, subset, or other grouping of virtual address locations associated with the memory device that contain virtual address locations within the memory device in contrast with the data structures 732, which generally contain physical address locations within the memory device. The collection of virtual address (or portions thereof) that span the virtual bins 752 within the memory area 753 can be referred to herein in the alternative as a "memory resource" and, given the context of the disclosure, as a "second memory resource," herein.

Further, as shown in FIGS. 7A-7B, the memory area 755 includes a plurality of virtual bins 756-1-1, 756-1-2 to 756-3-Q, 756-2-1, 756-2-2 to 756-2-Q, 756-3-1, 756-3-2 to 756-3-Q, and 756-R-1, 756-R-2 to 756-R-Q (which can be referred to collectively as the "virtual bins 756," herein). In contrast to the data structures 732 and the virtual bins 752, which are in a foreground are of the memory banks 750 and, hence are located in a foreground area of the memory device, the virtual bins 756 are located in a background are of the memory banks 750 and therefore are located in a background area of the memory device.

In some embodiments, merging first-in first-out (FIFOs) 754-1, 754-2, 754-3 to 754-4 (referred to herein collectively as the "merging FIFOs 754), which can be analogous to the merging FIFOs 654 illustrated in FIG. 6, herein, are provided to facilitate writing of the contents of the data structures 732 to the virtual bins 752. The merging FIFOs 754 can include hardware circuitry and/or can execute instructions to facilitate writing of the contents of the data structure 732 to respective virtual bins 752, as indicated by the arrows. For example, the merging FIFOS 754 can be configured to transfer, move, and/or merge multiple presorted (e.g., ordered) data structures 732 into one larger data structure to be written to a virtual bin 752.

In some embodiments, the contents of the respective data structures 732 are written to respective virtual bins 752 that are within a same memory bank 750 as the respective data structure 732. For example, the contents of the data structures 732-1-1, 732-1-2, 732-1-3, and 732-1-4 can be written via the merging FIFOs 754 to the virtual 752-1-1 in response to the data structures 732-1-1, 732-1-2, 732-1-3, and 732-1-4 containing greater than or equal to a threshold quantity of data entries (e.g., in response to the data structures 732-1-1, 732-1-2, 732-1-3, and 732-1-4 being filled with data entries). Once the contents of the data structures 732-1-1, 732-1-2, 732-1-3, and 732-1-4 have been written to the virtual bin 752-1-1, the data structures 732-1-1, 732-1-2, 732-1-3, and 732-1-4 are filled with new (e.g., subsequent) data entries. In response to the data structures 732-1-1, 732-1-2, 732-1-3, and 732-1-4 containing greater than or equal to a threshold quantity of subsequent data entries (e.g., in response to the data structures 732-1-1, 732-1-2, 732-1-3, and 732-1-4 being filled with the data entries that are written to the data structures 732-1-1, 732-1-2, 732-1-3, and 732-1-4 subsequent to the contents of the data structures 732-1-1, 732-1-2, 732-1-3, and 732-1-4 being written to the virtual bin 752-1-1), the contents of the data structures 732-1-1, 732-1-2, 732-1-3, and 732-1-4 can be written via the merging FIFOs 754 to the virtual bin 752-1-2. In this manner a first virtual bank 752 is filled with the contents of the data structures 732 (e.g., with the contents of four data structures in a same memory bank 750), the data structures 732 are then filled with new data entries, the contents of the data structures 732 are written to a second virtual bank 752 to fill the second virtual bank 752, etc.

The remaining virtual bins 752 are filled in a similar manner with the contents from data structures 732 of each respective memory bank 750 being written via the merging FIFOs 754 to virtual bins 752 in a same respective memory bank 750 that also contains the data structure 750 from which the contents are written. Accordingly, the contents of the data structures 732-2-1, 732-2-2, 732-2-3, and 732-2-4 associated with the memory bank 750-2 are written via the merging FIFOs 754 to the virtual bins 752-2-1, 752-2-2 to 752-2-P associated with the memory bank 750-2 as the data structures 732-2-1, 732-2-2, 732-2-3, and 732-2-4 become filled with data entries and so on and so forth.

When one or more of the virtual bins 752 become filled with data entries (e.g., become filled with the contents of the data structures 732), the virtual bin(s) 752 can be readdressed (as shown by the arrow between the virtual bin 752-1-P and the virtual bin 756-1-1) to move the contents of a full virtual bin 752 from the foreground area of a memory device that include the memory banks 750 to an empty virtual bin 756 in the background area of the memory device that includes the memory banks 750. In order to maintain enough empty virtual bins in the foreground area of the memory device to receive the contents of subsequently filled data structures 732, the virtual bins 756 can be readdressed (as shown by the arrow between the virtual bin 756-R-1 and the virtual bin 752-X-P) to move the contents of an empty virtual bin 756 from the background area of the memory device that include the memory banks 750 to the foreground area of the memory device. As discussed above, this movement can be achieved by readdressing the virtual addresses associated with the virtual bins 752 and 756 and can therefore be accomplished in the absence of performance of read operations, write operations, copy operations, and/or one or more program/erase cycles, etc.

Once all the virtual bins 752 in the foreground are filled and all the virtual bins 756 in the background except for the last row of background virtual bins 756-1-Q, 756-2-Q, 756-3-Q, and 756-R-Q are filled, the contents of the data structures (once filled) can be written directly to the virtual bins 756-1-Q, 756-2-Q, 756-3-Q, and 756-R-Q via the merging FIFOs 754, as indicated by the arrow on the right side of FIG. 7B. With all the virtual bins 752 and the virtual bins 756 now filled, the data structures 732 can once more be filled with new data entries. Once the data structures 732 are filled with new data entries, the memory banks 750 are no longer able to accept new data entries until at least some data entries stored in the data structures 732, the virtual bins 752, and/or the virtual bins 756 are deleted.

In embodiments in which each of four memory banks 750-1, 750-2, 750-3, and 750-X contains four data structures 732, three virtual bins 752, and four virtual bins 756, eleven binary search operations can be performed to locate a particular data entry within the memory banks. As described above by only requiring eleven search operations in this embodiment, performance of a computing system in which the memory banks 750 are deployed can be improved in comparison to approaches that require, at minimum, seventeen searching operations to locate a particular data entry in a filled set of memory banks 750.

In a non-limiting example, an apparatus (e.g., memory sub-system 110/210 illustrated in FIG. 1 and FIG. 2) includes a memory device (e.g., the memory device 130/140 illustrated in FIG. 1) that includes multiple memory banks 750. Each of the memory banks 750 includes a first memory area 751 that includes multiple data structures 732 that each include a plurality of physical address locations (e.g., the physical address locations 218/318/418/518 illustrated in FIG. 2, FIGS. 3A-3H, FIG. 4, and FIGS. 5A-5B) and a second memory area 752 that includes multiple (virtual) bins 752 that each include a plurality of virtual address locations.

The apparatus further includes a processing device (e.g., the virtual binning circuitry 113/213 illustrated in FIG. 1 and FIG. 2, the processor 117 illustrated in FIG. 1, and/or the processing device 902 illustrated in FIG. 9, herein). The processing device is configured to write data entries to a first data structure (e.g., the data structure 732-1-1) associated with a first memory bank (e.g., the memory bank 750-1). The processing device can write the entries to the data structure in any manner described above (e.g., sequentially, non-sequentially, randomly, in ascending order, in descending order, etc.).

However, in one embodiment, the processing device can write the data entries to the data structure by (1) writing a first data entry to a first address location of the first data structure associated with the first memory bank, wherein the first address location is neither (e.g., is between) a lowermost physical address (e.g., the first address location 518-1 illustrated in FIGS. 5A-5B, herein) of the first data structure associated with the first memory bank nor an uppermost physical address (e.g., the last address location 518-N illustrated in FIGS. 5A-5B, herein) of the first data structure associated with the first memory bank and (2) writing a plurality of subsequent data entries to respective subsequent address locations of the first data structure associated with the first memory bank based on, for each subsequent data entry, a relative numerical value of each subsequent data entry with respect to previously written data entries in the first data structure associated with the first memory bank. For example, as described above, data entries having lower numerical values can be written to address locations that are closer to the lowermost physical address or the uppermost physical address while data entries having higher numerical values can be written to address locations that are closer to the other of the lowermost physical address or the uppermost physical address to maintain the data structure 732 in an ordered fashion.

As discussed above, in some embodiments, the processing device is configured to write data entries to the first data structure associated with the first memory bank such that the data entries written to the first data structure associated with the first memory bank are numerically ordered. Similarly, the processing device can write data entries to each of the data structures 732 such that the data entries written to the each of the data structures 732 associated with each of the memory bank 750 are numerically ordered (e.g., in an ascending numerical order or a descending numerical order).

The processing device can be further configured to determine that the first data structure associated with the first memory bank stores a threshold quantity of data entries. In some embodiments, the determination that the first data structure associated with the first memory bank stores a threshold quantity of data entries can correspond to a determination that the first data structure is full (e.g., a data entry is written to each address location of the first memory bank). The processing device can write the contents of the first data structure associated with the first memory bank to a first portion of a first bin (e.g., the virtual bin 752-1-1) associated with the first memory bank. For example, each of the virtual bins 752 can be divided into portions that each contain enough virtual address locations to store one of the data structures 732. In one embodiment, each of the virtual bins 752 includes four portions and each of the four portions of the virtual bank 752 can store the contents of one data structure. Stated alternatively, in embodiments in which the virtual bins 752 include four portions, the contents of the data structures 732-1-1, 732-1-2, 732-1-3, and 732-1-4 can be written to, for example, the virtual bin 752-1-1.

Continuing with this non-limiting example, the processing device can write data entries to a second data structure (e.g., the data structure 732-1-2) associated with the first memory bank by (1) writing a first data entry to a first address location of the second data structure associated with the first memory bank, wherein the first address location is neither (e.g., is between) a lowermost physical address of the second data structure associated with the first memory bank nor an uppermost physical address of the second data structure associated with the first memory bank and (2) writing a plurality of subsequent data entries to respective subsequent address locations of the second data structure associated with the first memory bank based on, for each subsequent data entry, a relative numerical value of each subsequent data entry with respect to previously written data entries in the second data structure associated with the first memory bank.

The processing device can further determine that the second data structure associated with the first memory bank stores a threshold quantity of data entries and write the contents of the second data structure associated with the first memory bank to a second portion of the first bin associated with the first memory bank. In this manner, the portions of the virtual bins 752 can be filled with the contents of multiple data structures 732, as described above.

In some embodiments, the processing device is further configured to write the contents of the first data structure associated with the first memory bank to the first portion of the first bin associated with the first memory bank and write the contents of the second data structure associated with the first memory bank to the second portion of the first bin associated with the first memory bank at least partially concurrently. For example, the contents of multiple data structures 732 can be written to a particular virtual bin 752 in the same memory bank 750 as the data structures 732 are written via the merging FIFOs 754 such that at least some data entries from one of the data structures are being written to the particular virtual bin 752 at a same time as at least some data entries from a different one of the data structures are being written to the particular virtual bin 752.

The processing device can determine the first bin contains greater than or equal to a threshold quantity of contents of the data structures and readdress the virtual addresses associated with the first bin to move the first bin to a third memory area 755. That is, once the first bin is filled with the contents of multiple data structures 732, the processing device can update the virtual addresses associated with the first bin to cause the first bin to appear as one of the virtual bins 756, which is located in the background area of the memory device. As mentioned above, the first memory area 751 and the second memory area 753 can be in a foreground area of the memory device and the third memory area 755 can be in a background area of the memory device.

Continuing with this non-limiting example, the processing device can write data entries to a first data structure (e.g., the data structure 732-2-1) associated with a second memory bank (e.g., the memory bank 750-2) by (1) writing a first data entry to a first address location of the first data structure associated with the second memory bank, wherein the first address location is neither (e.g., is between) a lowermost physical address of the first data structure associated with the second memory bank nor an uppermost physical address of the first data structure associated with the second memory bank and (2) writing a plurality of subsequent data entries to respective subsequent address locations of the first data structure associated with the second memory bank based on, for each subsequent data entry, a relative numerical value of each subsequent data entry with respect to previously written data entries in the first data structure associated with the second memory bank.

The processing device can determine that the first data structure associated with the second memory bank stores a threshold quantity of data entries and write the contents of the first data structure associated with the second memory bank to a first portion of a first (virtual) bin (e.g., the virtual bin 752-2-1) associated with the second memory bank. In some embodiments, the processing device can write the contents of the first data structure (e.g., the data structure 732-1-1) associated with the first memory bank (e.g., the memory bank 750-1) to the first portion of the first bin (e.g., the virtual bin 752-1-1) associated with the first memory bank and write the contents of the first data structure (e.g., the data structure 732-2-1) associated with the second memory bank (e.g., the memory bank 750-2) to the first portion of the first bin (e.g., the virtual bin 752-2-1) associated with the second memory bank at least partially concurrently. In some embodiments this concurrent writing of the contents of the data structures 732 from different memory bank 750 can be facilitated by the merging FIFOs 754.

Figure 8:
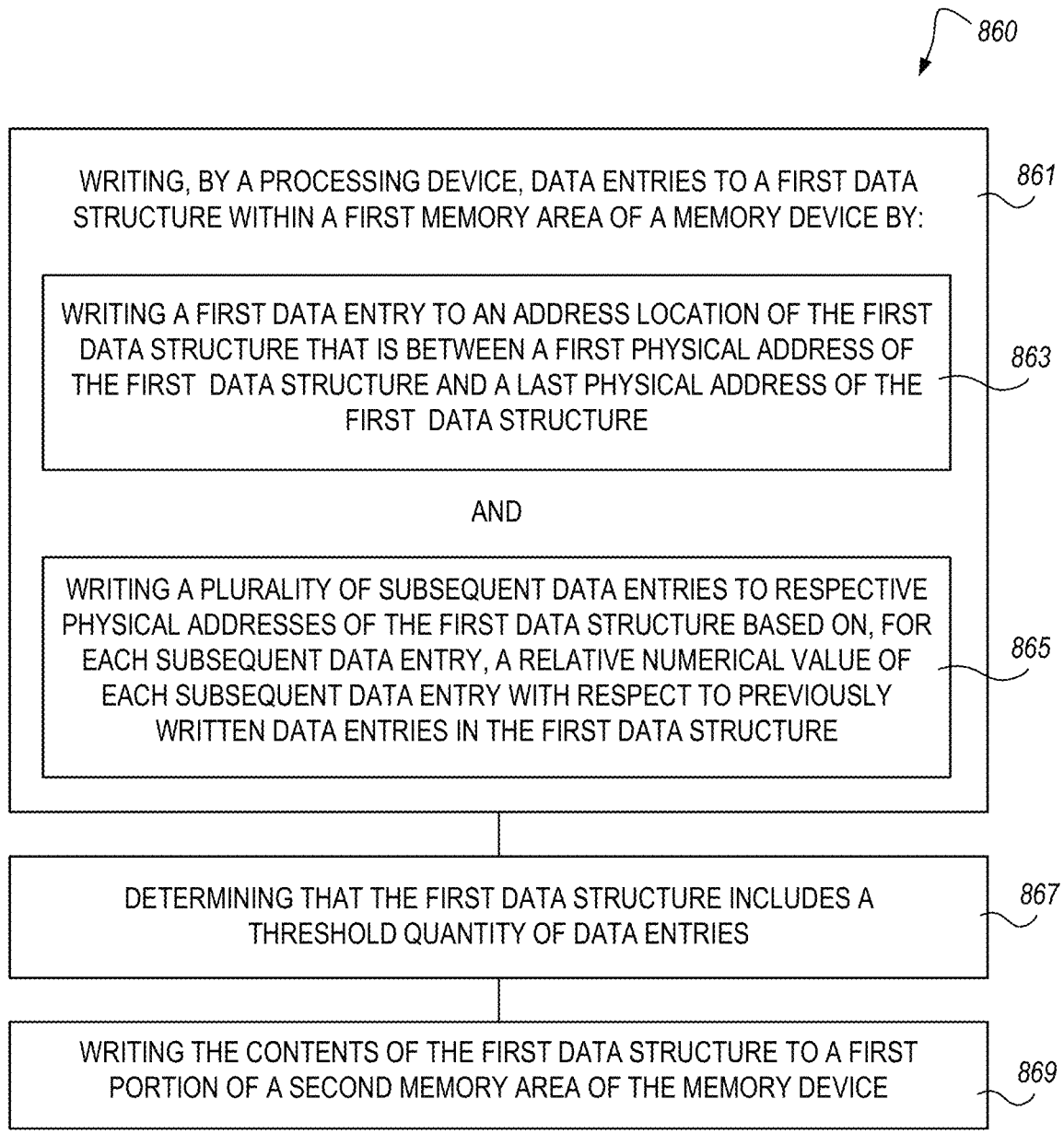
FIG. 8 is a flow diagram corresponding to a method for virtual binning in a memory device in accordance with some embodiments of the present disclosure.

FIG. 8 is a flow diagram corresponding to a method 860 for virtual binning in a memory device in accordance with some embodiments of the present disclosure. The method 860 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 860 is performed by the virtual binning circuitry 113 of FIG. 1 and/or the virtual binning circuitry 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 861, the method 860 includes writing, by a processing device (e.g., the virtual binning circuitry 113/213 illustrated in FIG. 1 and FIG. 2, the processor 117 illustrated in FIG. 1, and/or the processing device 902 illustrated in FIG. 9, herein), data entries to a first data structure (e.g., the data structure 232/332/532/632/732 illustrated in FIG. 2, FIGS. 3A-3H, FIG. FIG. 6, and FIGS. 7A-7B, herein) within a first memory area (e.g., the memory area 651/751 illustrated in FIG. 6, and FIGS. 7A-7B, herein) of a memory device (e.g., the memory device 130/140 illustrated in FIG. 1, herein). In some embodiments, the processing device can write such entries by, at operation 863, writing a first data entry to an address location of the first data structure that is neither (e.g., is between) a first physical address of the first center allocation data structure nor a last physical address of the first data structure and, at operation 865, writing a plurality of subsequent data entries to respective physical addresses of the first data structure based on, for each subsequent data entry, a relative numerical value of each subsequent data entry with respect to previously written data entries in the first data structure. In some embodiments, the method 860 includes writing the plurality of subsequent data entries to the respective physical addresses of the first data structure in an ascending numerical order or in a descending numerical order. The first data structure can be a center allocation data structure, as described above; however, embodiments are not so limited, and the data structure can be any type of data structure that stores data entries that are ordered or un-ordered and written in any order deemed necessary depending on the architecture of the memory device in which such entries are stored.

At operation 867, the method 860 further includes determining that the data structure includes a threshold quantity of data entries. For example, the method 860 can include determining that the first data structure has data entries written to every available address location associated therewith and is therefore unable to receive additional data entry writes.

At operation 869, the method 860 further includes writing the contents of the first data structure to a first portion (e.g., to a first portion of a virtual bin, such as the virtual bins 752 illustrated in FIGS. 7A-7b, herein) of a second memory area (e.g., the memory area 653/753 illustrated in FIG. 6, and FIGS. 7A-7B, herein) of the memory device. In some embodiments, the second memory area includes multiple virtual memory locations that are partitioned into virtual bins as shown in FIG. 6 and FIGS. 7A-7B.

The method 860 can further include writing, by the processing device, data entries to a second data structure within the first memory area of the memory device by (1) writing a first data entry to an address location of the second data structure that is neither (e.g., is between) a first physical address of the second data structure nor a last physical address of the second data structure and (2) writing a plurality of subsequent data entries to respective physical addresses of the second data structure based on, for each subsequent data entry, a relative numerical value of each subsequent data entry with respect to previously written data entries in the second data structure. In such embodiments, the method 860 can further include determining that the second data structure includes a threshold quantity of data entries and writing the contents of the second data structure to a second portion of the second memory area of the memory device, as described herein in connection with FIG. 6 and FIGS. 7A-7B.

As discussed above, the second memory area of the memory device can comprise one or more virtual bins and the first portion and the second portion of the second memory area comprise virtual address locations associated with the virtual bin(s). In such embodiments, the method 860 can further include determining the virtual bin is full and readdressing the virtual address locations associated with the virtual bin to move contents of the virtual bin to a third memory area, as described above in connection with FIGS. 7A-7B. In some embodiments, the method 860 can further include receiving an instruction to retrieve a particular data entry that is written to the virtual bin and performing a binary search operation to locate the particular data entry. For example, once the virtual bin is full, a search can be performed to retrieve a particular data entry that may be written to the virtual bin.

As described above, the memory device can include a plurality of memory banks (e.g., the memory banks 650/750 illustrated in FIG. 6 and FIGS. 7A-7B, herein) and the first center allocation data structure and the first portion of the second memory area can be associated with (e.g., can be part of or located within) a first memory bank of the memory device. In such embodiments, the method 860 can further include writing, by the processing device, data entries to a second data structure within a second bank of the memory device that is within the first memory area by (1) writing a first data entry to an address location of the second data structure that is neither (e.g., is between) a first physical address of the second data structure nor a last physical address of the second center allocation data structure and (2) writing a plurality of subsequent data entries to respective physical addresses of the second data structure based on, for each subsequent data entry, a relative numerical value of each subsequent data entry with respect to previously written data entries in the second data structure. The method 860 can further include determining that the second data structure includes a threshold quantity of data entries and writing the contents of the second data structure to a second portion of the second memory area of the memory device that is within the second bank of the memory device, as described herein in connection with FIG. 6 and FIGS. 7A-7B.

In order to generate the data structure(s), the method 860 can include writing, to a data structure (e.g., the data structure 232 illustrated in FIG. 2 and/or the center allocation data structure 332 illustrated in FIGS. 3A-3H, herein), a first data entry at a physical location that is neither (e.g., is between) a lowermost physical location (e.g., the first physical address) of a memory resource (e.g., the memory resource 216/316/416/516 illustrated in FIGS. 2, 3A-3H, 4, and 5A-5B, herein) nor an uppermost physical location (e.g., the last physical address) of the memory resource. As discussed above, writing the first data entry to the address location that is neither (e.g., is between) the lowermost physical location of the memory resource nor the uppermost physical location of the memory resource can include writing the first data entry to an address location in the memory resource that is substantially equidistant from the lowermost physical location of the memory resource and the uppermost physical location of the memory resource. Embodiments are not so limited, however, and as described above, the data structure(s) can be generated by writing data entries sequentially to the data structure based on the order in which such data entries are received, writing entries to the data structure in order to maintain and ordered data structure (e.g., an ascending or descending data structure), writing the data entries randomly to the data structure, etc.

The method 860 can further include determining whether a second data entry to be written to the memory resource has a value that is greater than a value associated with the first data entry or a value that is less than the value associated with the first data entry.

In some embodiments, the method 860 includes in response to determining that the second data entry has the value that is greater than a value associated with the first data entry, writing the second data entry to an address location of the memory resource that is physically located between the address location of the memory resource to which the first data entry is written and the uppermost physical location of the memory resource.

The method 860 can include, in response to determining that the second data entry has the value that is less than the value associated with the first data entry, writing the second data entry to an address location of the memory resource that is physically located between the address location of the memory resource to which the first data entry is written and the lowermost physical location of the memory resource.

The method 860 can further include determining that a third data entry to be written to the memory resource has a value that is less than the value associated with the first data entry and greater than the second data entry and writing the third data entry to a physical address within the second addressable memory zone in response to the determination or the method 860 can include determining that a third data entry to be written to the memory resource has a value that is greater than the value associated with the second data entry and writing the third data entry to a physical address within the fourth addressable memory zone in response to the determination.

Embodiments are not so limited, however, and the method 860 can include determining that a third data entry to be written to the memory resource has a value that is greater than the value associated with the first data entry and less than the second data entry and writing the third data entry to a physical address within the third addressable memory zone in response to the determination or the method can include determining that a third data entry to be written to the memory resource has a value that is less than the value associated with the first data entry and greater than the second data entry and writing the third data entry to a physical address within the second addressable memory zone in response to the determination.

As described in connection with FIGS. 5A-5B, the method 860 can include dividing an address space (e.g., the address space 235 illustrated in FIG. 2, herein) associated with the memory resource into a plurality of addressable memory zones (e.g., the addressable memory zones 534 illustrated in FIGS. 5A-5B, herein). For example, the address space associated with the memory resource can be divided into a first addressable memory zone contains physical address locations of the memory resource that are between the lowermost physical location of the memory resource and an address that demarcates a midway point between the lowermost physical location of the memory resource and an address location in the memory resource that is substantially equidistant from the lowermost physical location of the memory resource and the uppermost physical location of the memory resource.

The address space associated with the memory resource can be further divided into a second addressable memory zone contains physical address locations of the memory resource that are between the address that demarcates the midway point between the lowermost physical location of the memory resource and the address location in the memory resource that is substantially equidistant from the lowermost physical location of the memory resource and the uppermost physical location of the memory resource, a third addressable memory zone contains physical address locations of the memory resource that are between the address location in the memory resource that is substantially equidistant from the lowermost physical location of the memory resource and the uppermost physical location of the memory resource and an address that demarcates the midway point between the uppermost physical location of the memory resource and the address location in the memory resource that is substantially equidistant from the lowermost physical location of the memory resource and the uppermost physical location of the memory resource, and a fourth addressable memory zone contains physical address locations of the memory resource that are between the address location in the memory resource that demarcates the midway point between the uppermost physical location of the memory resource and the address location in the memory resource that is substantially equidistant from the lowermost physical location of the memory resource and the uppermost physical location of the memory resource and the uppermost physical location of the memory resource. As discussed above, the address space of the memory resource can be divided into fewer or additional memory zones as needed based on the quantity of data entries that are stored within the memory device.

FIG. 9 is a block diagram of an example computer system in which embodiments of the present disclosure may operate. For example, FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the center allocation circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

The processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to virtual binning center allocation circuitry or center allocation circuitry (e.g., the center allocation circuitry 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a first memory resource, of a memory device, that is configured to store a data structure, the first memory resource being coupled to a second memory resource, of the memory device, that is configured to store a plurality of data structures; and
a processing device coupled to the first memory resource and the second memory resource, wherein the processing device is configured to:
write data entries to the data structure within the first memory resource;
determine that the data structure includes a threshold quantity of the data entries;
write contents of the data structure to a first data structure among the plurality of data structures within the second memory resource; and
transfer, to a third memory resource of the memory device, the data entries, written to the second memory resource, without rewriting the data entries, written to the second memory resource, to the third memory resource, wherein:
prior to the data structure including the threshold quantity of the data entries, the first memory resource and the second memory resource operate in a foreground portion of the memory device, and
subsequent to the data structure including the threshold quantity of the data entries, the processing device is configured to transfer the data entries, written to the second memory resource, to the third memory resource while the third memory resource operates in a background portion of the memory device.

2. The apparatus of claim 1, wherein the first memory resource comprises a portion of a first memory area of a memory bank of the memory device and the second memory resource comprises a portion of a second memory area of the memory bank of the memory device.

3. The apparatus of claim 1, wherein the first memory resource comprises physical memory locations and the second memory resource comprises virtual memory locations.

4. The apparatus of claim 1, wherein the processing device is configured to readdress the data entries, written to the second memory resource, to transfer the data entries, written to the second memory resource, to the third memory resource without rewriting the data entries, written to the second memory resource, to the third memory resource.

5. The apparatus of claim 1, wherein the processing device is further configured to write data entries to the data structure within the first memory resource by:
writing a first data entry to an address location, of the first memory resource, that is between a first physical address of the first memory resource and a last physical address of the first memory resource; and
writing a plurality of subsequent data entries to respective physical addresses of the first memory resource based on, for each subsequent data entry, a relative numerical value of each subsequent data entry with respect to previously written data entries in the first memory resource.

6. An apparatus, comprising:
a memory device that includes a plurality of memory banks, wherein each memory bank among the plurality of memory banks includes a first memory area comprising a plurality of data structures that each include a plurality of physical address locations and a second memory area comprising a plurality of bins that each include a plurality of virtual address locations; and
a processing device coupled to the memory device, wherein the processing device is configured to:
write data entries to a first data structure associated with a first memory bank;
determine that the first data structure stores a threshold quantity of data entries;
write contents of the first data structure to a first portion of a first bin among the plurality of bins in the second memory area;
in response to determining that the first bin contains greater than or equal to a threshold quantity of contents of the data structures, readdress one or more of the plurality of virtual address locations associated with the first bin to move the first bin to a third memory area.

7. The apparatus of claim 6, wherein the processing device is configured to write the data entries to the first data structure where the data entries, written to the first data structure, are numerically ordered.

8. The apparatus of claim 6, wherein the processing device is configured to write the data entries to the first data structure associated with the first memory bank by:
writing a first data entry to a first address location of the first data structure associated with the first memory bank, wherein the first address location is between a lowermost physical address of the first data structure associated with the first memory bank and an uppermost physical address of the first data structure associated with the first memory bank; and
writing a plurality of subsequent data entries to respective subsequent address locations of the first data structure associated with the first memory bank based on, for each subsequent data entry, a relative numerical value of each subsequent data entry with respect to previously written data entries in the first data structure associated with the first memory bank.

9. The apparatus of claim 6, wherein the processing device is further configured to:
write data entries to a second data structure associated with the first memory bank;
determine that the second data structure stores a threshold quantity of data entries; and
write contents of the second data structure to a second portion of the first bin associated with the first memory bank.

10. The apparatus of claim 9, wherein the processing device is further configured to:
write the data entries to the second data structure associated with the first memory bank by:
writing a first data entry to a first address location of the second data structure associated with the first memory bank, wherein the first address location is between a lowermost physical address of the second data structure associated with the first memory bank and an uppermost physical address of the second data structure associated with the first memory bank; and
writing a plurality of subsequent data entries to respective subsequent address locations of the second data structure associated with the first memory bank based on, for each subsequent data entry, a relative numerical value of each subsequent data entry with respect to previously written data entries in the second data structure associated with the first memory bank.

11. The apparatus of claim 9, wherein the processing device is further configured to partially concurrently:
write the contents of the first data structure associated with the first memory bank to the first portion of the first bin associated with the first memory bank;
and write the contents of the second data structure associated with the first memory bank to the second portion of the first bin associated with the first memory bank.

12. The apparatus of claim 6, wherein the first memory area and the second memory area are in a foreground area of the memory device, and wherein the third memory area is in a background area of the memory device.

13. The apparatus of claim 6, wherein the processing device is configured to:
write data entries to a first data structure associated with a second memory bank;
determine that the first data structure, associated with the second memory bank, stores a threshold quantity of data entries; and
write contents of the first data structure, associated with the second memory bank, to a first portion of a first bin associated with the second memory bank.

14. The apparatus of claim 13, wherein the processing device is further configured to partially concurrently:
write the contents of the first data structure associated with the first memory bank to the first portion of the first bin associated with the first memory bank; and
write the contents of the first data structure associated with the second memory bank to the first portion of the first bin associated with the second memory bank.

15. A method, comprising:
writing, by a processing device, data entries to a first data structure within a first memory area of a memory device by:
writing a first data entry to an address location, of the first data structure, that is between a first physical address of the first data structure and a last physical address of the first data structure; and
writing a plurality of subsequent data entries to respective physical addresses of the first data structure based on, for each subsequent data entry, a relative numerical value of each subsequent data entry with respect to previously written data entries in the first data structure;
determining that the first data structure includes a threshold quantity of data entries;
writing contents of the first data structure to a first portion of a second memory area of the memory device, wherein the second memory area of the memory device comprises a virtual bin and the first portion of the second memory area comprises virtual address locations associated with the virtual bin;

determining the virtual bin is full; and in response to determining that the virtual bin is full, readdressing the virtual address locations associated with the virtual bin to move contents of the virtual bin to a third memory area.

16. The method of claim 15, further comprising:

writing, by the processing device, data entries to a second data structure within the first memory area of the memory device by:

writing a first data entry to an address location, of the second data structure, that is between a first physical address of the second data structure and a last physical address of the second data structure;

writing a second plurality of subsequent data entries to respective physical addresses of the second data structure based on, for each of the second plurality of subsequent data entries, a relative numerical value of each of the second plurality of subsequent data entries with respect to previously written data entries in the second data structure;

determining that the second data structure includes a threshold quantity of data entries; and writing contents of the second data structure to a second portion of the second memory area of the memory device.

17. The method of claim 15, further comprising:

receiving an instruction to retrieve a particular data entry that is written to the virtual bin; and performing a binary search operation to locate the particular data entry.

18. The method of claim 15, further comprising writing, in an ascending numerical order or in a descending numerical order, the plurality of subsequent data entries to the respective physical addresses of the first data structure.

19. The method of claim 15, wherein:

the memory device comprises a plurality of memory banks, the first data structure and the first portion of the second memory area are associated with a first memory bank of the memory device, and the method further comprises:

writing, by the processing device, data entries to a data structure, within a second bank of the memory device, that is within the first memory area by:

writing a first data entry to an address location, of the data structure within the second bank of the memory device, that is between a first physical address of the data structure within the second bank of the memory device and a last physical address of the data structure within the second bank of the memory device;

writing a second plurality of subsequent data entries to respective physical addresses of the data structure within the second bank of the memory device based on, for each of the second plurality of subsequent data entries, a relative numerical value of each of the second plurality of subsequent data entries with respect to previously written data entries in the data structure within the second bank of the memory device;

determining that the data structure, within the second bank of the memory device, includes a threshold quantity of data entries; and writing contents of the data structure within the second bank of the memory device to a second portion of the second memory area of the memory device that is within the second bank of the memory device.

20. The method of claim 15, wherein the first data structure is a center allocation data structure.

* * * * *